(12) United States Patent
Lee

(10) Patent No.: US 12,154,371 B2
(45) Date of Patent: Nov. 26, 2024

(54) ELECTRONIC DEVICE AND METHOD OF DRIVING ELECTRONIC DEVICE

(71) Applicant: Samsung Display Co., Ltd., Yongin-si (KR)

(72) Inventor: Soongyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 105 days.

(21) Appl. No.: 17/946,664

(22) Filed: Sep. 16, 2022

(65) Prior Publication Data

US 2023/0186672 A1 Jun. 15, 2023

(30) Foreign Application Priority Data

Dec. 15, 2021 (KR) ........................ 10-2021-0179496

(51) Int. Cl.
*G06V 40/13* (2022.01)
*G06V 10/141* (2022.01)
*G06V 10/143* (2022.01)
*G06F 3/0354* (2013.01)

(52) U.S. Cl.
CPC ........ *G06V 40/1318* (2022.01); *G06V 10/141* (2022.01); *G06V 10/143* (2022.01); *G06F 3/03545* (2013.01)

(58) Field of Classification Search
None
See application file for complete search history.

(56) References Cited

U.S. PATENT DOCUMENTS

| | | | |
|---|---|---|---|
| 10,978,523 B2 | 4/2021 | Park et al. | |
| 2019/0357779 A1* | 11/2019 | Park | A61B 5/02241 |
| 2022/0285461 A1* | 9/2022 | Hatsumi | H10K 59/40 |
| 2023/0238369 A1* | 7/2023 | Kusunoki | H01L 27/146 |
| | | | 257/79 |

FOREIGN PATENT DOCUMENTS

| | | |
|---|---|---|
| KR | 10-2019-0134378 | 12/2019 |
| KR | 10-2020-0040196 | 4/2020 |
| KR | 10-2020-0072845 | 6/2020 |

* cited by examiner

*Primary Examiner* — Joseph R Haley
(74) *Attorney, Agent, or Firm* — KILE PARK REED & HOUTTEMAN PLLC

(57) ABSTRACT

An electronic device includes a display panel including a base layer, and an element layer disposed on the base layer, the element layer including pixels outputting a first light, and light receiving sensors, an input device providing a second light to the display panel, and a control module controlling operations of the display panel and the input device. The light receiving sensors detect the second light provided from the input device and generate a detection signal. The control module calculates biometric information of a user based on the detection signal.

22 Claims, 18 Drawing Sheets

ELECTRONIC DEVICE AND METHOD OF DRIVING ELECTRONIC DEVICE

CROSS-REFERENCE TO RELATED APPLICATION(S)

This application claims priority to and benefits of Korean Patent Application No. 10-2021-0179496 under 35 U.S.C. § 119, filed on Dec. 15, 2021, in the Korean Intellectual Property Office, the entire contents of which are incorporated herein by reference.

BACKGROUND

1. Technical Field

Embodiments of the disclosure relate to an electronic device and a method of driving an electronic device capable of recognizing biometric information.

2. Description of the Related Art

A display device provides various functions to provide information to a user by displaying an image or to communicate with the user, such as by detecting the user's input. Display devices may include a function to detect the user's biometric information.

Biometric information recognition schemes include a capacitive scheme that detects a change in capacitance between electrodes, an optical scheme that detects incident light by using an optical sensor, and an ultrasonic scheme that detects vibration by using a piezoelectric material or the like.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide an electronic device capable of measuring biometric information of a user through an input device providing light.

According to an embodiment, an electronic device may include a display panel including a base layer, and an element layer disposed on the base layer, the element layer including pixels outputting a first light, and light receiving sensors. The electronic device includes an input device providing a second light to the display panel, and a control module controlling operations of the display panel and the input device. The light receiving sensors may detect the second light provided from the input device and generate a detection signal. The control module may calculate biometric information of a user based on the detection signal.

According to an embodiment of the disclosure, each of the pixels may include a light emitting element, and a pixel driving circuit electrically connected to the light emitting element and controlling an operation of the light emitting element. Each of the light receiving sensors may include a light receiving element, and a sensing driving circuit electrically connected to the light receiving element and controlling an operation of the light receiving element.

According to an embodiment of the disclosure, the light emitting element and the light receiving element may be disposed on a same layer.

According to an embodiment of the disclosure, the input device may include a light emitting module providing the second light, and an emission controller electrically connected to the light emitting module and controlling an operation of the light emitting module.

According to an embodiment of the disclosure, the control module may receive a setting signal including information about a type of the biometric information to be measured. The control module may convert the setting signal into an emission control signal capable of being recognized by the input device, and may transmit the emission control signal to the emission controller. The emission controller may control the operation of the light emitting module depending on the emission control signal.

According to an embodiment of the disclosure, the control module may include a readout block receiving the detection signal from the light receiving sensors. The readout block may calculate the biometric information based on the setting signal and the detection signal.

According to an embodiment of the disclosure, the emission controller may determine a wavelength of the second light generated by the light emitting module in response to the emission control signal.

According to an embodiment of the disclosure, the biometric information may include fingerprint information of the user, and the second light may have a wavelength in a visible light band.

According to an embodiment of the disclosure, the second light may be red light or green light.

According to an embodiment of the disclosure, the biometric information may include pulse information of the user, and the second light may have a wavelength in an infrared band.

According to an embodiment of the disclosure, the second light may have a wavelength of about 780 nm to about 1400 nm.

According to an embodiment of the disclosure, the biometric information may include blood oxygen saturation information of the user. The second light may have a wavelength in a visible light band during a first period and may have a wavelength in an infrared band during a second period.

According to an embodiment of the disclosure, the first period and the second period may be arranged alternately.

According to an embodiment of the disclosure, the light emitting module may include a first sub light emitting module providing first sub light having a first wavelength band, and a second sub light emitting module providing second sub light having a second wavelength band different from the first wavelength band.

According to an embodiment of the disclosure, the biometric information may include fingerprint information of the user. The emission controller may turn on the first sub light emitting module and turn off the second sub light emitting module, and the light emitting module may output the first sub light as the second light.

According to an embodiment of the disclosure, the biometric information may include pulse information of the user. The emission controller may turn on the second sub light emitting module and turn off the first sub light emitting module, and the light emitting module may output the second sub light as the second light.

According to an embodiment of the disclosure, the biometric information may include blood oxygen saturation information of the user. During a first period, the emission controller may turn on the first sub light emitting module and may output the first sub light as the second light. During a second period, the emission controller may turn on the second sub light emitting module and may output the second sub light as the second light. The first period and the second period may be arranged alternately.

According to an embodiment, an electronic device may include a display panel including a base layer, and an element layer disposed on the base layer, the element layer including pixels outputting a first light, and light receiving sensors. The electronic device may include an input device providing second light to the display panel, and a control module controlling operations of the display panel and the input device. The light receiving sensors may detect the first light and the second light and generate a detection signal. The control module may measure biometric information of a user based on the detection signal.

According to an embodiment of the disclosure, each of the pixels may include a light emitting element, and a pixel driving circuit electrically connected to the light emitting element and controlling an operation of the light emitting element. Each of the light receiving sensors may include a light receiving element, and a sensing driving circuit electrically connected to the light receiving element and controlling an operation of the light receiving element.

According to an embodiment of the disclosure, the control module may receive a setting signal including information about the biometric information to be measured, and may determine a wavelength of the first light generated by the display panel from the setting signal. The control module may convert the setting signal into an emission control signal capable of being recognized by the input device and may transmit the emission control signal to the input device. The input device may determine a wavelength of the second light depending on the emission control signal.

According to an embodiment of the disclosure, the input device may include a light emitting module providing the second light, and an emission controller electrically connected to the light emitting module and controlling an operation of the light emitting module in response to the emission control signal.

According to an embodiment of the disclosure, the biometric information may include fingerprint information of the user, and the first light and the second light may have a same wavelength band in a visible light band.

According to an embodiment of the disclosure, the biometric information may include at least one of pulse information of the user and a blood oxygen saturation level of the user. During a first period, the display panel may output the first light and the first light may have a wavelength in a visible light band. During a second period, the input device may output the second light and the second light may have a wavelength in an infrared band. The first period may not overlap the second period on a time axis.

According to an embodiment of the disclosure, in case that the biometric information corresponds to the blood oxygen saturation level, a wavelength of the first light may be determined to be a red band wavelength.

According to an embodiment, a driving method of an electronic device which includes an input device and a display panel including a base layer and an element layer which includes pixels outputting a first light, and light receiving sensors, may include determining whether the electronic device requests fingerprint information of a user. The driving method of the electronic device may include determining whether the input device provides the display panel with a second light. The driving method of the electronic device may include receiving the first light and the second light and generating a detection signal during a first light receiving period. The driving method of the electronic device may include measuring the fingerprint information of the user based on the detection signal.

According to an embodiment of the disclosure, in case that the input device does not provide the display panel with the second light, the light receiving sensors may receive the first light during a second light receiving period and generate the detection signal. A length of the first light receiving period may be shorter than a length of the second light receiving period.

BRIEF DESCRIPTION OF THE FIGURES

The above and other objects and features of the disclosure will become apparent by describing in detail, embodiments thereof with reference to the accompanying drawings.

DETAILED DESCRIPTION OF THE EMBODIMENTS

Figure 1:
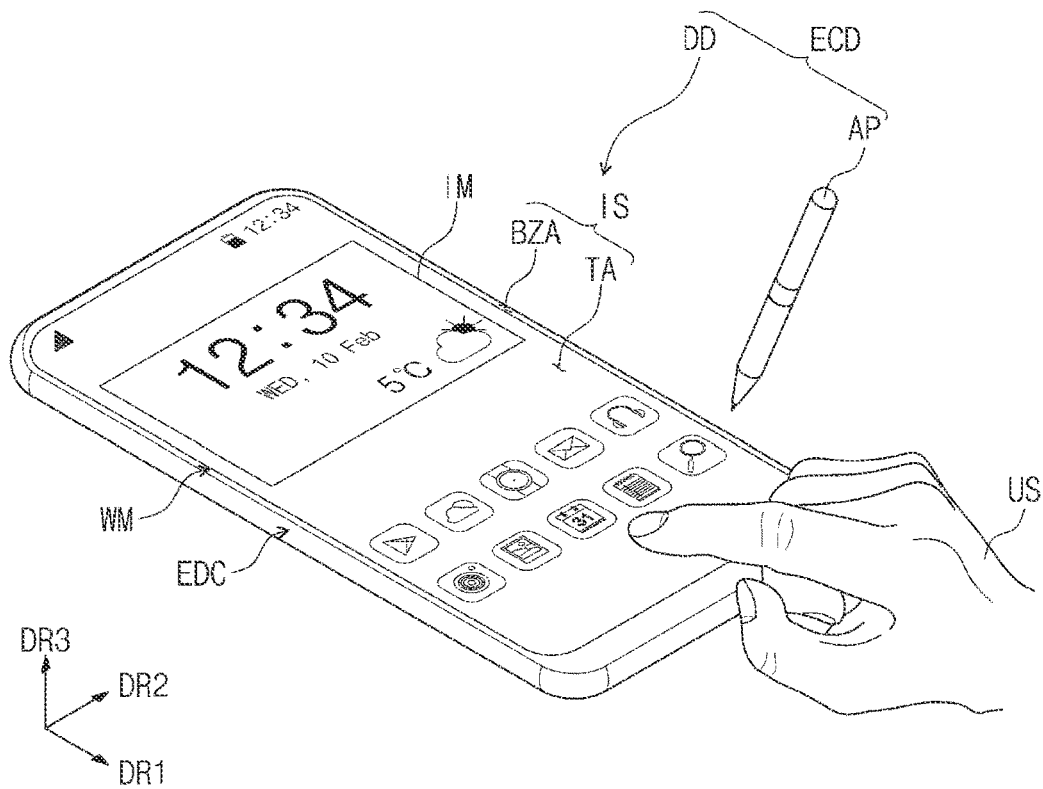
FIG. 1 is a schematic perspective view of an electronic device, according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the specification, the expression that a first component (or region, layer, part, portion, etc.) is "on," "connected to," or "coupled to" a second component means that the first component is directly on, connected to, or coupled to the second component or means that a third component is interposed therebetween.

The same reference numerals refer to the same components. In the drawings, the thickness, ratio, and dimension of components may be exaggerated for effectiveness of description of technical contents.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Although the terms "first," "second," etc., may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The articles "a," "an," and "the" are singular in that they have a single referent, but the use of the singular form in the specification should not preclude the presence of more than one referent.

The terms "under," "below," "on," "above," etc., are used to describe the correlation of components illustrated in the drawings. The terms that are relative in concept are described based on a direction shown in the drawings.

It will be understood that the terms "include," "comprise," "have," etc. specify the presence of features, numbers, steps, operations, elements, or components, described in the specification, or a combination thereof, not precluding the presence or additional possibility of one or more other features, numbers, steps, operations, elements, or components or a combination thereof.

"About," "substantially," or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 2:
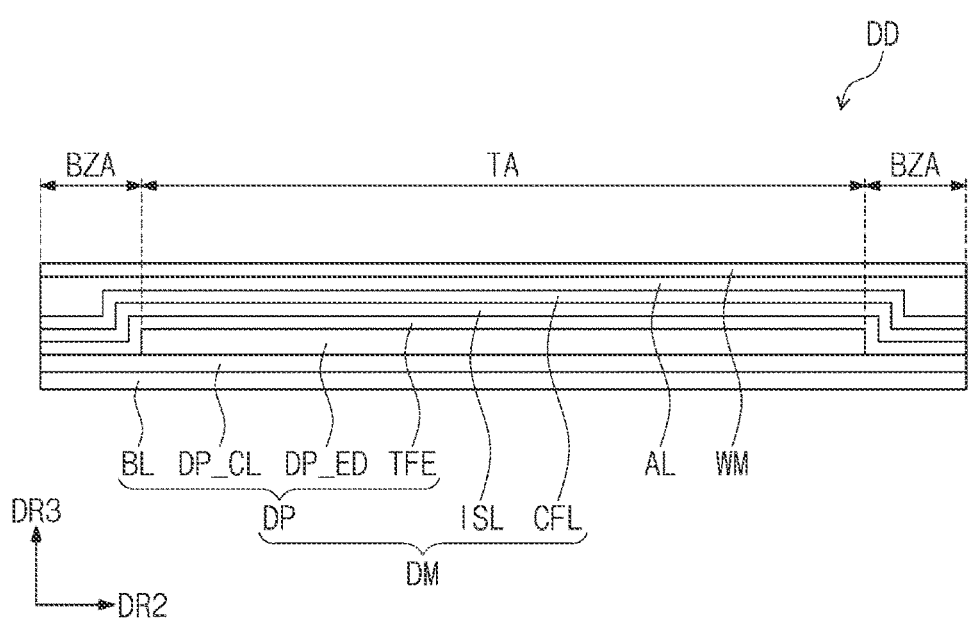
FIG. 2 is a schematic cross-sectional view of a display device according to an embodiment of the disclosure.

FIG. 1 is a schematic perspective view of an electronic device, according to an embodiment of the disclosure. FIG. 2 is a schematic cross-sectional view of a display device, according to an embodiment of the disclosure.

Referring to FIGS. 1 and 2, an electronic device ECD according to an embodiment of the disclosure includes a display device DD and an input device AP.

The display device DD may be a device activated depending on an electrical signal. The display device DD may include various embodiments. For example, the display device DD may be applied on an electronic device such as a smart watch, a tablet PC, a notebook computer, a computer, a smart television, or the like.

The display device DD has a long side in a first direction DR1 and a short side in a second direction DR2 intersecting the first direction DR1. The display device DD has a quadrangle whose corners are rounded. However, the shape of the display device DD is not limited thereto. For example, the display device DD may have various shapes (e.g., a circular shape). The display device DD may display an image IM on a display surface IS, which is parallel to each of the first direction DR1 and the second direction DR2, in a third direction DR3. The display surface IS on which the image IM is displayed may correspond to a front surface of the display device DD. In the specification, the meaning of "when viewed from above a plane" may mean "when viewed in the third direction DR3".

A top surface of the display device DD may be defined as the display surface IS, and may be parallel to a plane defined by the first direction DR1 and the second direction DR2. The image IM generated by the display device DD may be provided to a user through the display surface IS. In the embodiment, an upper surface (or a front surface) and a lower surface (or a rear surface) of each member are defined based on a direction in which the image IM is displayed. The upper surface may be opposite to the lower surface in the third direction DR3, and a normal direction of each of the upper surface and the lower surface may be parallel to the third direction DR3. A separation distance between the upper surface and the lower surface in the third direction DR3 may correspond to a thickness of the display device DD in the third direction DR3. Directions indicated by the first, second, and third directions DR1, DR2, and DR3 may be relative to each other and may be changed to different directions.

The display surface IS may be divided into a transparent area TA and a bezel area BZA. The transparent area TA may be an area in which the image IM is displayed. A user US visually perceives the image IM through the transparent area TA. In an embodiment, the transparent area TA is illustrated in the shape of a quadrangle whose corners are rounded. However, this is illustrated as an example. The transparent area TA may have various shapes, not limited to an embodiment.

The bezel area BZA is adjacent to the transparent area TA. The bezel area BZA may have a selected color. The bezel area BZA may surround the transparent area TA. Accordingly, the shape of the transparent area TA may be substantially defined by the bezel area BZA. However, this is illustrated as an example. For example, the bezel area BZA may be disposed adjacent to only one side of the transparent area TA or may be omitted.

The display device DD may sense an external input applied from the outside. The external input may include various types of inputs that are provided from the outside of the display device DD. For example, the external input may be one or a combination of various types of external inputs, such as a part of the user's body, such as a hand of the user US, light, heat, or pressure. In an embodiment, it is described that a part of the body of the user US is a touch input applied to a front surface by a hand of the user US. However, this is an example. As described above, the body part of the user US may be provided in various forms. The display device DD may also detect an input of the user US applied to a side surface or a rear surface of the display device DD depending on a structure of the display device DD and is not limited to an embodiment.

The display device DD according to an embodiment of the disclosure may detect an externally-applied input. The externally applied input may include inputs by an input device (e.g., a stylus pen, an active pen, a touch pen, an electronic pen, an e-pen, or the like) in addition to a finger of a user US. The display device DD and the input device AP may communicate with each other bidirectionally. The display device DD may provide an uplink signal ULS (refer to FIG. 6) to the input device AP. For example, the uplink signal ULS may include a synchronization signal or information of the display device DD, but is not particularly limited thereto. The input device AP may provide a downlink signal DLS (refer to FIG. 6) to the display device DD. The downlink signal DLS may include a synchronization signal or state information of the input device AP. For example, the downlink signal DLS may include location information of the input device AP, battery information of the input device AP, slope information of the input device AP, and/or various pieces of information stored in the input device AP, but is not particularly limited thereto. The display device DD may provide the input device AP with a signal WVS (refer to FIG. 6) for controlling an operation of the input device AP in response to the type of biometric information of the user US to be measured.

The display device DD may detect the user's biometric information applied from the outside. A biometric information sensing area capable of detecting the user's biometric information may be provided on the display surface IS of the display device DD. The biometric information sensing area may be provided in the entire area of the transparent area TA or may be provided in a partial area of the transparent area TA. For example, FIG. 1 illustrates that the entire transparent area TA is utilized as the biometric information sensing area.

The display device DD may include a window WM, a display module DM, and housing EDC. In an embodiment, an appearance of the display device DD may be implemented by coupling the window WM and the housing EDC.

A front surface of the window WM defines the display surface IS of the display device DD. The window WM may be formed of a transparent material capable of outputting the image IM. The window WM may include an optically transparent material. For example, the window WM may include glass or plastic. The window WM may include a multi-layer structure or a single-layer structure. For example, the window WM may include plastic films bonded to each other by an adhesive or may have a glass substrate and a plastic film bonded to each other by an adhesive.

The display module DM may include a display panel DP and an input sensing layer ISL. The display panel DP may display the image IM depending on an electrical signal. The input sensing layer ISL may sense an external input applied from the outside. The external input may be provided in various forms.

The display panel DP according to an embodiment of the disclosure may be a light emitting display panel, and is not particularly limited thereto. For example, the display panel DP may be an organic light emitting display panel, an inorganic light emitting display panel, a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, it is described that the display panel DP is an organic light emitting display panel.

Referring to FIGS. 1 and 2, the display panel DP includes a base layer BL, a circuit layer DP_CL, an element layer DP_ED, and an encapsulation layer TFE. The display panel DP according to an embodiment of the disclosure may be a flexible display panel. However, the disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, and the material thereof is not particularly limited. The base layer BL may include a glass substrate, a metal substrate, an organic/inorganic composite substrate, or the like.

The circuit layer DP_CL is interposed between the base layer BL and the element layer DP_ED. The circuit layer DP_CL includes at least one insulating layer and a circuit element. Hereinafter, the insulating layer included in the circuit layer DP_CL is referred to as an "intermediate insulating layer." The intermediate insulating layer includes at least one intermediate inorganic film and at least one intermediate organic film. The circuit element may include a pixel driving circuit, which is included in each of the pixels PX (refer to FIG. 3) for displaying the image IM, and a sensor driving circuit SDC (refer to FIG. 4), which is included in each of the light receiving sensors FX (refer to FIG. 3) for recognizing external information. The external information may be biometric information of the user US. For example, the light receiving sensors FX may be a fingerprint recognition sensor, a proximity sensor, an iris recognition sensor, or the like. Furthermore, the light receiving sensor may be an optical sensor that recognizes the biometric information in an optical scheme.

The circuit layer DP_CL may further include signal lines electrically connected to the pixel driving circuit and/or the sensor driving circuit.

The element layer DP_ED may include a light emitting element included in each of the pixels PX and a light receiving element included in each of the light receiving sensors FX. For example, the light receiving element may be a photodiode. The light receiving element may be a sensor that responds to light reflected by the body of the user US or light passing through the body of the user US. The circuit layer DP_CL and the element layer DP_ED will be described in detail later with reference to FIGS. 5 and 8.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include a silicon nitride layer, a silicon oxynitride layer, a silicon oxide layer, a titanium oxide layer, an aluminum oxide layer, or the like, but not limited particularly thereto. The organic film may include organic materials and may protect the element layer DP_ED from foreign objects such as dust particles.

The input sensing layer ISL may be formed on the display panel DP. The input sensing layer ISL may be disposed directly on the encapsulation layer TFE. According to an embodiment of the disclosure, the input sensing layer ISL may be formed on the display panel DP through a subsequent process. When the input sensing layer ISL is directly disposed on the display panel DP, an adhesive film is not interposed between the input sensing layer ISL and the encapsulation layer TFE. In other examples, the adhesive film may be interposed between the input sensing layer ISL and the display panel DP. The input sensing layer ISL may not be manufactured together with the display panel DP through the subsequent processes. For example, the input sensing layer ISL may be manufactured through a process separate from that of the display panel DP and may then be fixed on an upper surface of the display panel DP by the adhesive film.

The input sensing layer ISL may sense an external input (e.g., a user's touch), may change the sensed input into a selected input signal, and may provide the input signal to the display panel DP. The input sensing layer ISL may include sensing electrodes for sensing an external input. The sensing electrodes may sense the external input in a capacitive scheme. The display panel DP may receive an input signal from the input sensing layer ISL and may generate an image corresponding to the input signal.

The display module DM may further include a color filter layer CFL. For example, the color filter layer CFL may be disposed on the input sensing layer ISL. However, the disclosure is not limited thereto. The color filter layer CFL may be interposed between the display panel DP and the input sensing layer ISL. The color filter layer CFL may include color filters and a black matrix.

Details of the structures of the input sensing layer ISL and the color filter layer CFL will be described below in detail with reference to FIG. 8.

The display device DD according to an embodiment of the disclosure may further include an adhesive layer AL. The window WM may be attached to the input sensing layer ISL by the adhesive layer AL. The adhesive layer AL may include an optical clear adhesive, an optically clear adhesive resin, or a pressure sensitive adhesive (PSA).

The housing EDC may be coupled to the window WM to define the exterior appearance of the display device DD. The housing EDC is coupled to the window WM so as to provide inner space. The display module DM may be accommodated in the inner space. The housing EDC may include a material having relatively high rigidity. For example, the housing EDC may include glass, plastic, or metal or may include frames and/or plates that are composed of a combination thereof. The housing EDC may stably protect configurations of the display device DD accommodated in the inner space from an external impact. Although not illustrated in the drawings, a battery module for supplying power required for overall operations of the display device DD may be interposed between the display module DM and the housing EDC.

Figure 3:
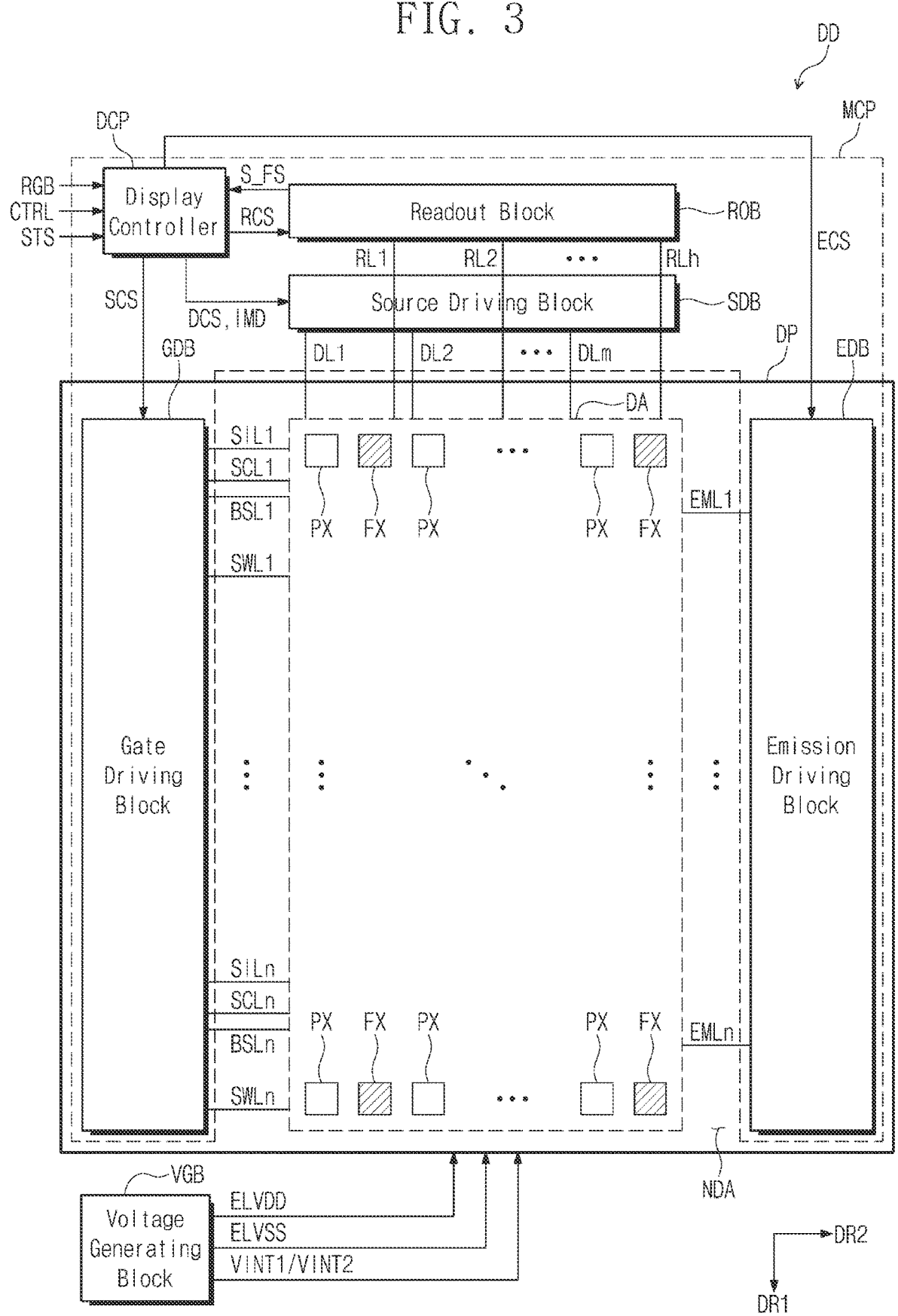
FIG. 3 is a block diagram of a display device according to an embodiment of the disclosure.

FIG. 3 is a block diagram of a display device, according to an embodiment of the disclosure.

Referring to FIG. 3, the display device DD includes the display panel DP and a control module MCP. In an embodiment of the disclosure, the control module MCP includes a display controller DCP, a source driving block SDB, a gate driving block GDB, an emission driving block EDB, a voltage generating block VGB, and a readout block ROB.

The control module MCP controls operations of the display panel DP and the input device AP (refer to FIG. 1). The display controller DCP included in the control module MCP receives an image signal RGB and an external control signal CTRL. The display controller DCP receives a setting signal STS including information about the type of biometric information of the user US (e.g., fingerprint information of the user US, pulse information of the user US, blood oxygen saturation information of the user US, or the like) to be measured through the light receiving sensors FX. In an embodiment of the disclosure, the user US may select a specific biometric signal, which is to be measured by using the electronic device ECD, from among biometric information of the user US. The selected biometric information may be required before the electronic device ECD performs an operation.

The display controller DCP generates an image data signal IMD that is obtained by converting the data format of the image signal RGB so as to be suitable for an interface specification with the source driving block SDB. At this time, the display controller DCP may generate the image data signal IMD by converting the data format of the image signal RGB such that the display panel DP outputs light LT1 (refer to FIG. 9B, hereinafter referred to as the "first light") for measuring the specified biometric information of the user US based on the setting signal STS.

The display controller DCP generates a gate driving signal SCS, a source driving signal DCS, an emission control signal ECS, and a read control signal RCS based on the external control signal CTRL. The display controller DCP receives the setting signal STS including information about the type of biometric information of the user US (e.g., fingerprint information of the user US, pulse information of the user US, blood oxygen saturation information of the user US, or the like) to be measured through the light receiving sensors FX. The display controller DCP generates the emission control signal WVS (refer to FIG. 6) capable of being recognized by the input device AP (refer to FIG. 1) based on the setting signal STS. The input device AP determines a wavelength band of light LT2 (refer to FIG. 6, hereinafter, referred to as the "second light") provided to the display panel DP depending on the emission control signal WVS. An operational relationship between the display controller DCP and the input device AP will be described below with reference to FIG. 6.

The source driving block SDB receives the source driving signal DCS and the image data signal IMD from the display controller DCP. The source driving block SDB converts the image data signal IMD into data signals, and outputs the data signals to data lines DL1 to DLm to be described below. The data signals refer to analog voltages corresponding to gray-scale values of the image data signal IMD.

The gate driving block GDB receives the gate driving signal SCS from the display controller DCP. The gate driving block GDB may output scan signals to scan lines to be described below in response to the gate driving signal SCS.

The voltage generating block VGB generates voltages necessary for an operation of the display panel DP. In an embodiment, the voltage generating block VGB generates a first driving voltage ELVDD, a second driving voltage ELVSS, a first initialization voltage VINT1, and a second initialization voltage VINT2. For example, the voltage generating block VGB may operate under control of the display controller DCP. For example, a voltage level of the first driving voltage ELVDD is greater than a voltage level of the second driving voltage ELVSS. A voltage level of each of the first and second initialization voltages VINT1 and VINT2 is smaller than a voltage level of the second driving voltage ELVSS. However, the disclosure is not limited thereto. For example, voltage levels and magnitude relationship of the first driving voltage ELVDD, the second driving voltage ELVSS, and the first and second initialization voltages VINT1 and VINT2, which are generated by the voltage generating block VGB, may vary depending on shapes of the display device DD and the display panel DP.

The display panel DP may include a display area DA corresponding to the transparent area TA (refer to FIG. 1) and a non-display area NDA corresponding to the bezel area BZA (refer to FIG. 1).

The display panel DP may include the pixels PX disposed in the display area DA and the light receiving sensors FX disposed in the display area DA. In an embodiment of the disclosure, each of the light receiving sensors FX may be interposed between two pixels PX adjacent to each other. The pixels PX and the light receiving sensors FX may be alternately disposed in the first and second directions DR1 and DR2. However, the disclosure is not limited thereto. Two or more pixels PX may be positioned between the two light receiving sensors FX adjacent to each other in the first direction DR1 among the light receiving sensors FX. The two or more pixels PX may be positioned between the two light receiving sensors FX adjacent to each other in the second direction DR2 among the light receiving sensors FX.

The display panel DP may further include initialization scan lines SIL1 to SILn, compensation scan lines SCL1 to SCLn, write scan lines SWL1 to SWLn, black scan lines BSL1 to BSLn, emission control lines EML1 to EMLn, the data lines DL1 to DLm, and sensing lines RL1 to RLh. The initialization scan lines SIL1 to SILn, the compensation scan lines SCL1 to SCLn, the write scan lines SWL1 to SWLn, the black scan lines BSL1 to BSLn, and the emission control lines EML1 to EMLn may extend in the second direction DR2. The initialization scan lines SIL1 to SILn, the compensation scan lines SCL1 to SCLn, the write scan lines SWL1 to SWLn, the black scan lines BSL1 to BSLn, and the emission control lines EML1 to EMLn are positioned spaced from one another in the first direction DR1. The data lines DL1 to DLm and the sensing lines RL1 to RLh extend in the first direction DR1 and are positioned spaced from one another in the second direction DR2.

The pixels PX may be electrically connected to the initialization scan lines SIL1 to SILn, the compensation scan lines SCL1 to SCLn, the write scan lines SWL1 to SWLn, the black scan lines BSL1 to BSLn, the emission control lines EML1 to EMLn, and the data lines DL1 to DLm. For example, each of the pixels PX may be electrically connected to four scan lines. However, the number of scan lines connected to each pixel PX is not limited thereto, and may be changed.

The light receiving sensors FX are electrically connected to the write scan lines SWL1 to SWLn and the sensing lines RL1 to RLh. However, the disclosure is not limited thereto. The number of lines respectively electrically connected to the light receiving sensors FX may be changed. In an embodiment of the disclosure, the number of sensing lines RL1 to RLh may correspond to ½ of the number of data lines DL1 to DLm. However, the disclosure is not limited thereto. In other examples, the number of the sensing lines RL1 to RLh may correspond to ¼ or ⅛ of the number of the data lines DL1 to DLm.

The gate driving block GDB may be positioned in the non-display area NDA of the display panel DP. The gate driving block GDB receives the gate driving signal SCS from the display controller DCP. In response to the gate driving signal SCS, the gate driving block GDB outputs initialization scan signals to the initialization scan lines SIL1 to SILn and outputs compensation scan signals to the compensation scan lines SCL1 to SCLn. In an embodiment of the disclosure, the gate driving block GDB may sequentially supply the initialization scan signals to the initialization scan lines SIL1 to SILn and may sequentially supply the compensation scan signals to the compensation scan lines SCL1 to SCLn. Furthermore, in response to the gate driving signal SCS, the gate driving block GDB may output write scan signals to the write scan lines SWL1 to SWLn and may output black scan signals to the black scan lines BSL1 to BSLn. In an embodiment of the disclosure, the gate driving block GDB may sequentially supply the write scan signals to the write scan lines SWL1 to SWLn and may sequentially supply the black scan signals to the black scan lines BSL1 to BSLn.

In other examples, the gate driving block GDB may include first and second gate driving blocks. The first gate driving block may output the initialization scan signals and the compensation scan signals. The second gate driving block may output the write scan signals and the black scan signals.

The emission driving block EDB may be disposed in the non-display area NDA of the display panel DP. The emission driving block EDB receives the emission control signal ECS from the display controller DCP. The emission driving block EDB may output the emission control signals to the emission control lines EML1 to EMLn in response to the emission control signal ECS. In other examples, the gate driving block GDB may be connected to the emission control lines EML1 to EMLn. The emission driving block EDB may be omitted, and the gate driving block GDB may output the emission control signals to the emission control lines EML1 to EMLn.

The readout block ROB receives the read control signal RCS from the display controller DCP. In an embodiment of the disclosure, the read control signal RCS may include the setting signal STS received by the display controller DCP. The readout block ROB may receive a detection signal from the sensing lines RL1 to RLh in response to the read control signal RCS. The readout block ROB provides the received detection signal to the display controller DCP. The display controller DCP calculates biometric information of the user US based on the detection signal. The display controller DCP specifies the type of biometric information of the user US, which is to be measured based on the setting signal STS, and calculates the specified biometric information of the user US based on the received detection signal.

Figure 4:
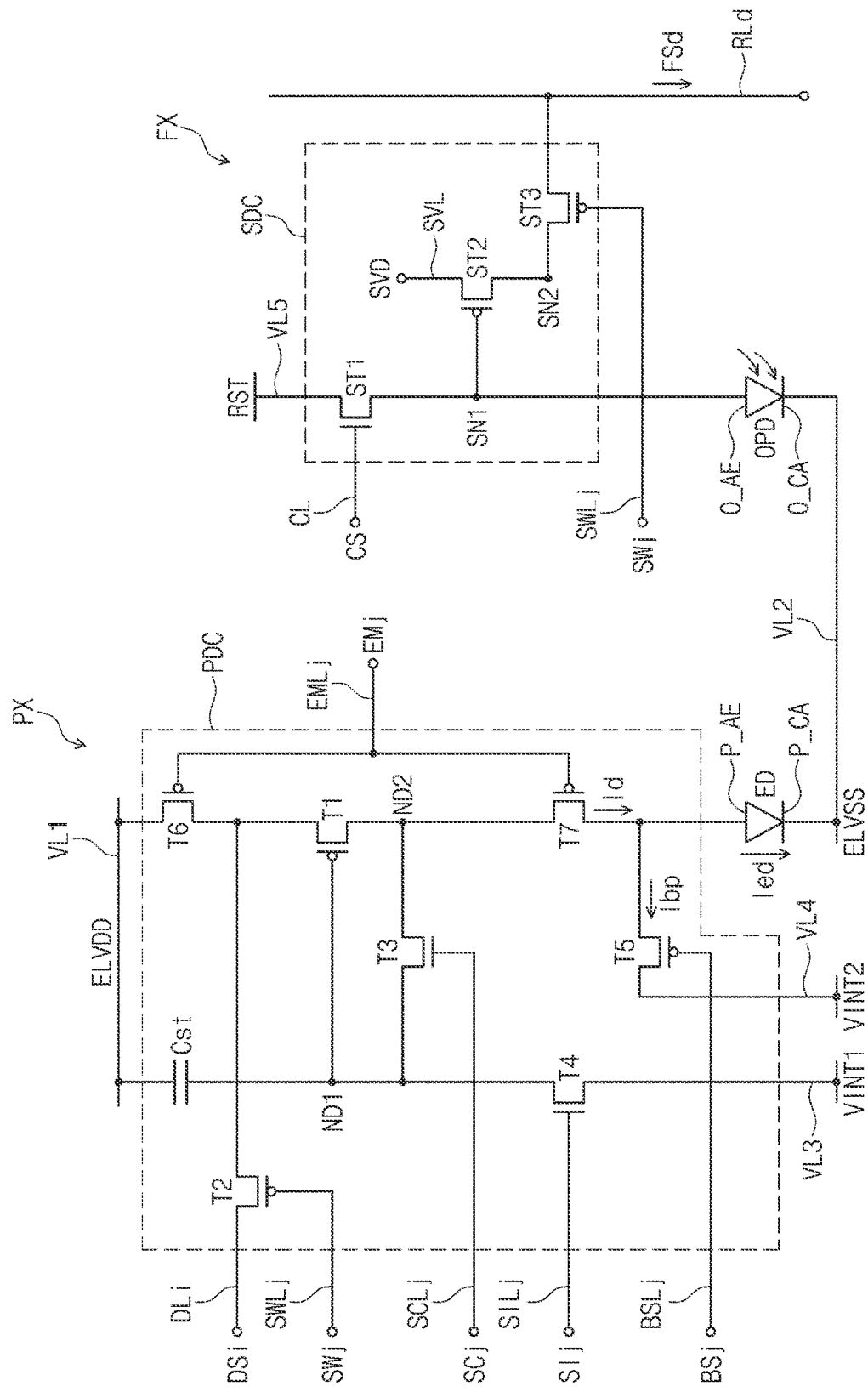
FIG. 4 is a schematic diagram of an equivalent circuit showing pixels and sensors of a display panel, according to an embodiment of the disclosure.

FIG. 4 is a schematic diagram of an equivalent circuit showing pixels and sensors of a display panel, according to an embodiment of the disclosure.

FIG. 4 shows an equivalent circuit diagram of one of the pixels PX shown in FIG. 3. A circuit structure of the pixel PX will be described. The pixels PX have the same structure, and thus, redundant descriptions will be omitted.

FIG. 4 shows an equivalent circuit diagram of one of the light receiving sensors FX shown in FIG. 3. The circuit structure of the light receiving sensor FX will be described below. The light receiving sensors FX have the same structure, and thus, redundant descriptions will be omitted.

Referring to FIG. 4, the pixel PX may be electrically connected to the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan line SWLj of the write scan lines SWL1 to SWLn, the j-th black scan line BSLj of the black scan lines BSL1 to BSLn, and the j-th emission control line EMLj of the emission control lines EML1 to EMLn.

The pixel PX may include a light emitting element ED and a pixel driving circuit PDC. The light emitting element ED may be a light emitting diode. For example, the light emitting element ED may be an organic light emitting diode including an organic light emitting layer.

The pixel driving circuit PDC may include first to seventh transistors T1, T2, T3, T4, T5, T6, and T7 and a single capacitor Cst. At least one of the first to seventh transistors T1, T2, T3, T4, T5, T6, and T7 may be a transistor having a low-temperature polycrystalline silicon (LTPS) semiconductor layer. At least one of the first to seventh transistors T1, T2, T3, T4, T5, T6, and T7 may be a transistor having an oxide semiconductor layer. Some of the first to seventh transistors T1, T2, T3, T4, T5, T6, and T7 may be P-type transistors, and the others may be N-type transistors. For example, the first, second, fifth, sixth, and seventh transistors T1, T2, T5, T6, and T7 may be PMOS transistors, and the third and fourth transistors T3 and T4 may be NMOS transistors. For example, the third and fourth transistors T3 and T4 may be oxide semiconductor transistors, and the first, second, fifth, sixth, and seventh transistors T1, T2, T5, T6, and T7 may be LTPS transistors.

A configuration of the pixel driving circuit PDC according to an embodiment of the disclosure is not limited to the embodiment illustrated in FIG. 4. The pixel driving circuit PDC illustrated in FIG. 4 is only an example, and the configuration of the pixel driving circuit PDC may be modified when implemented. For example, all of the first to seventh transistors T1, T2, T3, T4, T5, T6, and T7 may be P-type transistors or N-type transistors.

The j-th initialization scan line SILj, the j-th compensation scan line SCLj, the j-th write scan line SWLj, the j-th black scan line BSLj, and the j-th emission control line EMLj may transfer a j-th initialization scan signal SIj, a j-th compensation scan signal SCj, a j-th write scan signal SWj, a j-th black scan signal BSj, and a j-th emission control signal EMj to the pixel PX, respectively. The i-th data line DLi transfers an i-th data signal Di to the pixel PX. The i-th data signal Di may have a voltage level corresponding to the image signal RGB (refer to FIG. 3) input to the display device DD (refer to FIG. 3).

The first and second driving voltage lines VL1 and VL2 may transfer the first and second driving voltages ELVDD and ELVSS to the pixel PX, respectively. The first and second initialization voltage lines VL3 and VL4 may also transfer the first and second initialization voltages VINT1 and VINT2 to the pixel PX, respectively.

The first transistor T1 may be electrically connected between the first driving voltage line VL1 receiving the first driving voltage ELVDD and the light emitting element ED. The first transistor T1 may include a first electrode electrically connected to the first driving voltage line VL1 via the sixth transistor T6, a second electrode electrically connected to an anode electrode P_AE of the light emitting element ED via the seventh transistor T7, and a third electrode electrically connected to one end (e.g., a first node ND1) of the capacitor Cst. The first transistor T1 may receive the i-th data signal Di transferred through the i-th data line DLi depending on a switching operation of the second transistor T2 and may supply a driving current Id to the light emitting element ED.

The second transistor T2 may be electrically connected between the i-th data line DLi and the first electrode of the first transistor T1. The second transistor T2 may include a first electrode electrically connected to the i-th data line DLi, a second electrode electrically connected to the first electrode of the first transistor T1, and a third electrode electrically connected to the j-th write scan line SWLj. The second transistor T2 may be turned on in response to the write scan signal SWj transferred through the j-th write scan line SWLj and then may transfer the i-th data signal Di transferred from the i-th data line DLi to the first electrode of the first transistor T1.

The third transistor T3 may be electrically connected between the second electrode of the first transistor T1 and the first node ND1. The third transistor T3 may include a first electrode electrically connected to the third electrode of the first transistor T1, a second electrode electrically connected to the second electrode of the first transistor T1, and a third electrode electrically connected to the j-th compensation scan line SCLj. The third transistor T3 may be turned on in response to the j-th compensation scan signal SCj transferred through the j-th compensation scan line SCLj and may electrically connect the third electrode and the second electrode of the first transistor T1. The first transistor T1 may be diode-connected.

The fourth transistor T4 may be electrically connected between the first initialization voltage line VL3 to which the first initialization voltage VINT1 is applied and the first node ND1. The fourth transistor T4 may include a first electrode electrically connected to the first initialization voltage line VL3, a second electrode electrically connected to the first node ND1, and a third electrode electrically connected to the j-th initialization scan line SILj. The fourth transistor T4 is turned on in response to the j-th initialization scan signal SIj transferred through the j-th initialization scan line SILj. The fourth transistor T4 thus turned on may transfer the first initialization voltage VINT1 to the first node ND1 such that a potential of the third electrode of the first transistor T1 (i.e., a potential of the first node ND1) is initialized.

The sixth transistor T6 may include a first electrode electrically connected to the first driving voltage line VL1, a second electrode electrically connected to the first electrode of the first transistor T1, and a third electrode connected to the j-th emission control line EMLj.

The seventh transistor T7 may include a first electrode electrically connected to the second electrode of the first transistor T1, a second electrode electrically connected to the anode electrode P_AE of the light emitting element ED, and a third electrode electrically connected to the j-th emission control line EMLj.

The sixth and seventh transistors T6 and T7 may be simultaneously turned on in response to the j-th emission control signal EMj transferred through the j-th emission control line EMLj. The first driving voltage ELVDD applied through the sixth transistor T6 thus turned on may be compensated through the diode-connected first transistor T1 and then may be transferred to the light emitting element ED.

The fifth transistor T5 includes a first electrode electrically connected to the second initialization voltage line VL4 through which the second initialization voltage VINT2 is transferred, a second electrode electrically connected to the second electrode of the seventh transistor T7, and a third electrode electrically connected to the j-th black scan line BSLj. A voltage level of the second initialization voltage VINT2 may lower than or equal to that of the first initialization voltage VINT1.

As described above, one end of the capacitor Cst is electrically connected to the third electrode of the first transistor T1, and the other end of the capacitor Cst is electrically connected to the first driving voltage line VL1.

A cathode electrode P_CA of the light emitting element ED may be electrically connected to the second driving voltage line VL2 transferring the second driving voltage ELVSS. A voltage level of the second driving voltage ELVSS may be lower than a voltage level of the first driving voltage ELVDD. For example, the voltage level of the second driving voltage ELVSS may be lower than the voltage level of the first and second initialization voltages VINT1 and VINT2.

In an embodiment of the disclosure, within a single driving frame of the display panel DP (refer to FIG. 3), the j-th emission control signal EMj may include an emission period and a non-emission period. The j-th emission control signal EMj may have a high level during the non-emission period. During the non-emission period, the j-th initialization scan signal SIj is activated. During an activation period (hereinafter, referred to as a "first activation period") of the j-th initialization scan signal SIj, when the j-th initialization scan signal SIj of a high level is provided through the j-th initialization scan line SILj, the fourth transistor T4 may be turned on in response to the high level of the j-th initialization scan signal SIj. The first initialization voltage VINT1 may be transferred to the third electrode of the first transistor T1 via the fourth transistor T4 thus turned on, and the first node ND1 is initialized to the first initialization voltage VINT1. Accordingly, the first activation period may be defined as an initialization period of the pixel PX.

The j-th compensation scan signal SCj may be activated, and the third transistor T3 is turned on when the high level of the j-th compensation scan signal SCj is supplied through the j-th compensation scan line SCLj during an activation period (hereinafter, referred to as a "second activation period") of the j-th compensation scan signal SCj. The first transistor T1 is diode-connected when the third transistor T3 is turned on and is forward-biased. The first activation period may not overlap with the second activation period.

The j-th write scan signal SWj may be activated within the second activation period. The j-th write scan signal SWj may have a low level during an activation period (hereinafter, referred to as a "fourth activation period"). During the fourth activation period, the second transistor T2 may be turned on by the low level of j-th write scan signal SWj. A compensation voltage "Di-Vth" may be applied to the third electrode of the first transistor T1. Here, the compensation voltage "Di-Vth" may correspond to subtracting the threshold voltage Vth of the first transistor T1 from the voltage of the i-th data signal Di supplied from the i-th data line DLi. For example, a potential of the third electrode of the first transistor T1 may be the compensation voltage "Di-Vth". The fourth activation period may overlap the second activation period. The duration of the second activation period may be greater than the duration of the fourth activation period.

The first driving voltage ELVDD and the compensation voltage "Di-Vth" may be applied to both ends of the capacitor Cst, and charges corresponding to a voltage difference between both ends may be stored in the capacitor Cst. Herein, a high level period of the j-th compensation scan signal SCj may be referred to as a "compensation period" of the pixel PX.

The j-th black scan signal BSj may be activated within the second activation period of the j-th compensation scan signal SCj. The j-th black scan signal BSj may have a low level during the activation period (hereinafter, referred to as a "third activation period"). During the third activation period, the fifth transistor T5 may be turned on by receiving the low level of the j-th black scan signal BSj through the j-th black scan line BSLj. A portion of the driving current Id may be drained through the fifth transistor T5 as a bypass current Ibp. The third activation period may overlap the second activation period. The duration of the second activation period may be greater than the duration of the third activation period. The third activation period may precede the fourth activation period, and may not overlap the fourth activation period.

Assuming that the pixel PX displays a black image, even though a minimum driving current of the first transistor T1 flows as the driving current Id, the light emitting element ED emits a light. The pixel PX may fail to normally display a black image. Accordingly, the fifth transistor T5 according to an embodiment of the disclosure may drain, as the bypass current Ibp, a portion of the minimum driving current of the first transistor T1 to a current path that is different from the current path toward the light emitting element ED. The minimum driving current of the first transistor T1 means a leakage current flowing to the first transistor T1 under the condition that a gate-source voltage Vgs of the first transistor T1 is smaller than the threshold voltage Vth, for example, when the first transistor T1 is turned off. As the minimum driving current (e.g., a current of 10 pA or less) flowing to the first transistor T1 is transferred to the light emitting element ED under the condition that the first transistor T1 is turned off, black image, in terms of a gray scale, may be displayed. In case that the pixel PX displays the black image, the bypass current Ibp has a relatively large influence on the minimum driving current. In case that the pixel PX displays a normal image or a white image, the bypass current Ibp does not influence the driving current Id. Accordingly, assuming that the pixel PX displays a black image, a current (i.e., the light emitting current Ied) that corresponds to the result of subtracting the bypass current Ibp flowing through the seventh transistor T5 from the driving current Id is provided to the light emitting element ED, and thus a black image may be clearly displayed. Accordingly, the pixel PX may implement an accurate black image, in terms of a gray scale by using the fifth transistor T5, and thus, a contrast ratio may be improved.

The j-th emission control signal EMj that is supplied from the j-th emission control line EMLj may transition from the high level to the low level. The sixth and seventh transistors T6 and T7 are turned on by the low level emission control signal EMj. Because of the difference between the voltage of the third electrode of the first transistor T1 and the first driving voltage ELVDD, the driving current Id is generated. The driving current Id thus generated is supplied to the light emitting element ED through the seventh transistor T7, and a current Ied flows through the light emitting element ED.

Referring to FIG. 4, the light receiving sensor FX may be electrically connected to the d-th sensing line RLd among the sensing lines RL1 to RLh, the j-th write scan line SWLj, and a sensing control line CL.

The light receiving sensor FX includes a light receiving element OPD and the sensor driving circuit SDC. The light receiving element OPD may be a photodiode. For example, the light receiving element OPD may be an organic photodiode including an organic material as a photoelectric conversion layer. An anode electrode O_AE (hereinafter, referred to as a "sensor anode electrode") of the light receiving element OPD may be electrically connected to a first sensing node SN1. A cathode electrode O_CA (hereinafter, referred to as a "sensor cathode electrode") of the light receiving element OPD may be electrically connected to the second driving voltage line VL2 that delivers the second driving voltage ELVSS.

The sensor driving circuit SDC may include three transistors ST1 to ST3. The three transistors ST1 to ST3 may be a reset transistor ST1, an amplification transistor ST2, and an output transistor ST3, respectively. At least one of the reset transistor ST1, the amplification transistor ST2, and the output transistor ST3 may be an oxide semiconductor transistor. For example, the reset transistor ST1 may be an oxide semiconductor transistor, and the amplification transistor ST2 and the output transistor ST3 may be LTPS transistors. However, the disclosure is not limited thereto. The reset transistor ST1 and the output transistor ST3 may be oxide semiconductor transistors, and the amplification transistor ST2 may be an LTPS transistor.

At least one of the reset transistors ST1, the amplification transistors ST2, and the output transistors ST3 may be P-type transistors, and others may be an N-type transistor. For example, the amplification transistor ST2 and the output transistor ST3 may be PMOS transistors, and the reset transistor ST1 may be an NMOS transistor. However, the disclosure is not limited thereto. For example, all the transistors ST1, ST2, and ST3 may be N-type transistors or P-type transistors.

At least one of the reset transistor ST1, the amplification transistor ST2, and the output transistor ST3 may have the same type as each of the third and fourth transistors T3 and T4 of the pixel PX. The amplification transistor ST2 and the output transistor ST3 may be the same type as the first, second, fifth, sixth, and seventh transistors T1, T2, T5, T6, and T7 of the pixel PX.

A circuit configuration of the sensor driving circuit SDC according to the disclosure is not limited to an example illustrated in FIG. 4. The sensor driving circuit SDC illustrated in FIG. 4 is only an example, and the configuration of the sensor driving circuit SDC may be modified and implemented differently.

The reset transistor ST1 may include a first electrode electrically connected to a reset receiving line VL5 receiving a reset voltage RST, a second electrode electrically connected to the first sensing node SN1, and a third electrode electrically connected to the sensing control line CL receiving a sensing control signal CS. The reset transistor ST1 may reset the potential of the first sensing node SN1 to the reset voltage RST in response to the sensing control signal CS. In an embodiment of the disclosure, the sensing control line CL may be a line electrically insulated from the scan lines SWLj, SCLj, SILj, and SBLj. However, the disclosure is not limited thereto. In other examples, the sensing control signal CS may be the j-th compensation scan signal SCj supplied from the j-th compensation scan line SCLj. The sensing control line CL may be electrically connected to the j-th compensation scan line SCLj. The reset transistor ST1 may receive the j-th compensation scan signal SCj, which is supplied through the j-th compensation scan line SCLj, as the sensing control signal CS. However, the disclosure is not limited thereto, and the sensing control signal CS may be a signal separate from the j-th compensation scan signal SCj. The point in time when the sensing control signal CS is activated may be different from the point in time when the j-th compensation scan signal SCj is activated.

In an embodiment of the disclosure, the reset voltage RST may be a DC voltage lower than the second driving voltage ELVSS. However, the disclosure is not limited thereto. During at least the activation period of the sensing control signal CS, the reset voltage RST may have a voltage level lower than the second driving voltage ELVSS. In an embodiment of the disclosure, the voltage generating block VGB (refer to FIG. 3) may generate the reset voltage RST at the same voltage as one of the first and second initialization voltages VINT1 and VINT2.

The reset transistor ST1 may include sub reset transistors electrically connected to one another in series. For example, the reset transistor ST1 may include two sub reset transistors (hereinafter referred to as "first and second sub reset transistors"). A third electrode of the first sub reset transistor and a third electrode of the second sub reset transistor may be electrically connected to the sensing control line CL. A second electrode of the first sub reset transistor and a first electrode of the second sub reset transistor may be electrically connected. The reset voltage RST may be applied to a first electrode of the first sub reset transistor, and a second electrode of the second sub reset transistor may be electrically connected to the first sensing node SN1. However, the number of sub reset transistors is not limited thereto and may be variously changed or modified.

The amplification transistor ST2 includes a first electrode electrically connected to a sensing driving line SVL for receiving a sensing driving voltage SVD, a second electrode connected to a second sensing node SN2, and a third electrode connected to the first sensing node SN1. The amplification transistor ST2 may be turned on in response to the potential of the first sensing node SN1 and may apply the sensing driving voltage SVD to the second sensing node SN2. For example, the sensing driving voltage SVD may correspond to one of the first driving voltage ELVDD and the first and second initialization voltages VINT1 and VINT2. When the sensing driving voltage SVD is the first driving voltage ELVDD, the sensing driving line SVL may be electrically connected to the first driving voltage line VL1. When the sensing driving voltage SVD is the first initialization voltage VINT1, the sensing driving line SVL may be electrically connected to the first initialization voltage line VL3. When the sensing driving voltage SVD is the second initialization voltage VINT2, the sensing driving line SVL may be electrically connected to the second initialization voltage line VL4.

The output transistor ST3 includes a first electrode connected to the second sensing node SN2, a second electrode electrically connected to the d-th sensing line RLd, and a third electrode electrically connected to an output control line receiving an output control signal. The output transistor ST3 may deliver a d-th detection signal FSd to the d-th sensing line RLd in response to the output control signal. The output control signal may be the j-th write scan signal SWj supplied through the j-th write scan line SWLj. The output transistor ST3 may receive the j-th write scan signal SWj supplied from the j-th write scan line SWLj as the output control signal.

The light receiving element OPD of the light receiving sensor FX may be exposed to the light LT1 (refer to FIG. 9B, hereinafter referred to as the "first light") emitted from the light emitting element ED. The light receiving element OPD may be exposed to the light LT2 (refer to FIG. 6, hereinafter referred to as the "second light") provided from the input device AP (refer to FIG. 6) to be described below. In an embodiment of the disclosure, the light receiving element OPD generates photocharges corresponding to the first light LT1 and the second light LT2, and the generated photocharges may be accumulated in the first sensing node SN1. In case that the input device AP provides the second light LT2 towards the hand of the user US when the hand of the user US (refer to FIG. 1) touches the display surface IS (refer to FIG. 1) of the display device DD (refer to FIG. 1), the light receiving element OPD may generate photocharges corresponding to light passing through the hand of the user US among the second light LT2, and the generated photocharges may be accumulated in the first sensing node SN1. In case that the light emitting element ED emits the first light LT1 when the hand of the user US (refer to FIG. 1) touches the display surface IS (refer to FIG. 1) of the display device DD (refer to FIG. 1), the light receiving element OPD generates photocharges corresponding to light reflected by the hand of the user US among the first light LT1.

The d-th detection signal FSd flowing from the sensing driving line SVL to the d-th sensing line RLd through the amplification transistor ST2 when the output transistor ST3 is turned on is determined by the charge of the first sensing node SN1. In an embodiment of the disclosure, when the output transistor ST3 is a P-type transistor, as the amount of photocharges generated by the light receiving element OPD and stored in the first sensing node SN1 increases, the size of the d-th detection signal FSd may decrease.

Figure 5:
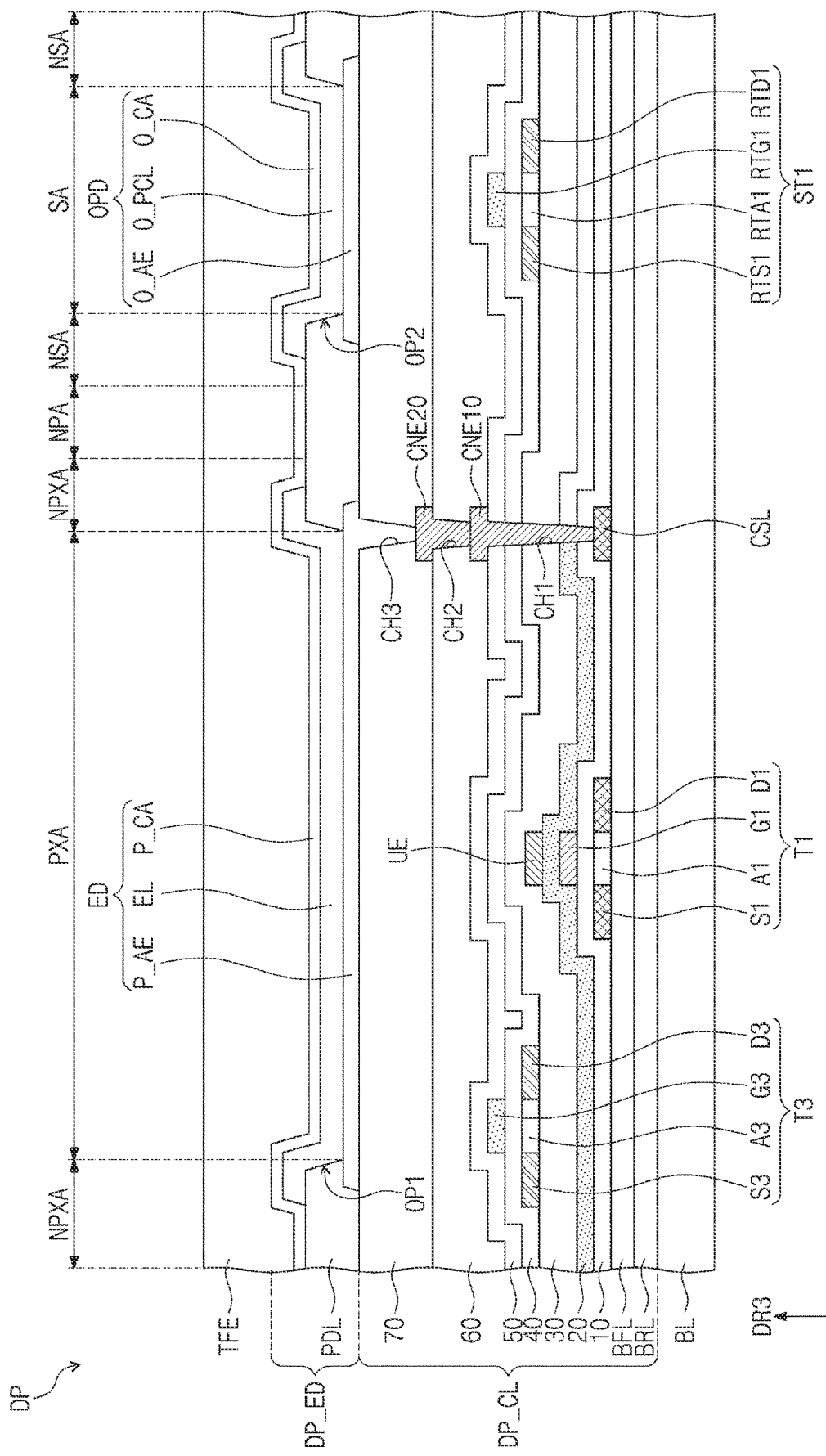
FIG. 5 is a schematic cross-sectional view illustrating a pixel and a sensor of a display panel, according to an embodiment of the disclosure.

FIG. 5 is a schematic cross-sectional view illustrating a pixel and a sensor of a display panel, according to an embodiment of the disclosure.

Referring to FIG. 5, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. The synthetic resin layer may be a polyimide-based resin layer, and the material thereof is not particularly limited. The synthetic resin layer may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. The base layer BL may include a glass substrate, a metal substrate, an organic/inorganic composite substrate, or the like.

At least one inorganic layer may be formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute a barrier layer BRL and/or a buffer layer BFL, which will be described below. The barrier layer BRL and the buffer layer BFL may be disposed selectively.

The barrier layer BRL prevents foreign objects from being introduced from the outside. The barrier layer BRL may include a silicon oxide layer and a silicon nitride layer. There are the silicon oxide layers and there are the silicon nitride layers. The silicon oxide layers and the silicon nitride layers may be alternately stacked.

The buffer layer BFL may be disposed on the barrier layer BRL. The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A semiconductor pattern may be disposed on the buffer layer BFL. The semiconductor pattern directly disposed on the buffer layer BFL is defined as a first semiconductor pattern. The first semiconductor pattern may include silicon semiconductors such as the first electrode S1, channel portion A1, and second electrode D1 of the first transistor T1. The first semiconductor pattern may include polysilicon. However, the disclosure is not limited thereto. For example, the first semiconductor pattern may include amorphous silicon. For convenience of description, FIG. 5 shows only a part of the semiconductor pattern of the pixel PX shown in FIG. 4.

FIG. 5 shows only a part of the first semiconductor pattern. For example, the first semiconductor pattern may be further disposed in another area of the pixel PX. An electrical property of the first semiconductor pattern varies depending on whether it is doped or not. The first semiconductor pattern may include a doped area and an undoped area. The doped area may be doped with N-type dopant or P-type dopant. A P-type transistor includes a doped area doped with the P-type dopant, and an N-type transistor includes a doped area doped with the N-type dopant.

The doped area has higher conductivity than the undoped area, and operates substantially as an electrode or signal line. The undoped area corresponds substantially to the active area (or channel) of a transistor. A portion of the first semiconductor pattern may be the active area of the transistor, other portions may include a source or drain of the transistor, and connection signal lines (or connection electrodes).

Referring to FIGS. 4 and 5, a first electrode S1, a channel portion A1, and a second electrode D1 of the first transistor T1 are formed from the first semiconductor pattern. The first electrode S1 and the second electrode D1 of the first transistor T1 extend in opposite directions from the channel portion A1.

A portion of a connection signal line CSL formed from the first semiconductor pattern is illustrated in FIG. 5. Although not illustrated separately, the connection signal line CSL may be electrically connected to the second electrode of the seventh transistor T7 (refer to FIG. 4) in a plan view.

A first insulating layer 10 is disposed on the buffer layer BFL. The first insulating layer 10 overlaps the pixels PX (refer to FIG. 3) in common so as to cover the first semiconductor pattern. The first insulating layer 10 may be an inorganic layer and/or an organic layer, and may have a single-layer or multi-layer structure. The first insulating layer 10 may include at least one of an aluminum oxide, a titanium oxide, a silicon oxide, a silicon oxynitride, a zirconium oxide, and a hafnium oxide. In an embodiment, the first insulating layer 10 may be a single silicon oxide layer. Other insulating layers of the circuit layer DP_CL to be described below (for example, the second to seventh insulating layers 20 to 70) as well as the first insulating layer 10 may be inorganic layers and/or organic layers. The insulating layers of the circuit layer DP_CL may have single-layer structures or multi-layer structures. The inorganic layers may include at least one of the materials described above.

A third electrode G1 of the first transistor T1 may be disposed on the first insulating layer 10. The third electrode G1 may be a portion of a metal pattern. The third electrode G1 of the first transistor T1 overlaps the channel portion A1 of the first transistor T1. In a process of doping the first semiconductor pattern, the third electrode G1 of the first transistor T1 may serve as a mask.

A second insulating layer 20 covering the third electrode G1 may be disposed on the first insulating layer 10. The second insulating layer 20 overlaps the pixels PX in common. The second insulating layer 20 may be an inorganic layer and/or an organic layer, and may have a single-layer structure or a multi-layer structure. In an embodiment, the second insulating layer 20 may be a silicon oxide layer having a single layer structure.

An upper electrode UE may be disposed on the second insulating layer 20. The upper electrode UE may overlap the third electrode G1. The upper electrode UE may be a portion of a metal pattern or a portion of a doped semiconductor pattern. A portion of the third electrode G1 and the upper electrode UE overlapping the portion of the third electrode G1 may define the capacitor Cst (refer to FIG. 4). In an embodiment of the disclosure, the upper electrode UE may be omitted.

In an embodiment of the disclosure, the second insulating layer 20 may be replaced with an insulating pattern. The upper electrode UE may be disposed on the insulating pattern. The upper electrode UE may serve as a mask for forming an insulating pattern from the second insulating layer 20.

A third insulating layer 30 covering the upper electrode UE may be disposed on the second insulating layer 20. In an embodiment, the third insulating layer 30 may be a silicon oxide layer having a single layer structure. A semiconductor pattern may be disposed on the third insulating layer 30. The semiconductor pattern directly disposed on the third insulating layer 30 may be defined as a second semiconductor pattern that includes the first electrode S3, active area A3, and second electrode D3 of the third transistor T3 and also includes the first electrode RTS1, the active area RTA1 and the second electrode RTD1 of the reset transistor ST1. The second semiconductor pattern may include metal oxide. The oxide semiconductor may include a crystalline or amorphous oxide semiconductor. For example, the oxide semiconductor may include oxides of metals (e.g., zinc (Zn), indium (In), gallium (Ga), tin (Sn), titanium (Ti), and the like) or a mixture of the metals (e.g., zinc (Zn), indium (In), gallium (Ga), tin (Sn), titanium (Ti), and the like) and oxides of the metals. The oxide semiconductors may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), and the like.

FIG. 5 shows only a part of the second semiconductor pattern. For example, the second semiconductor pattern may be further disposed in another area of the pixel PX. The second semiconductor pattern may include areas identified depending on whether the metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially has a role of an electrode or signal line. The non-reduction area corresponds substantially to a channel portion of a transistor. The portion of the second semiconductor pattern may be a channel portion of a transistor, and another portion may be a first electrode or a second electrode of the transistor.

As illustrated in FIG. 5, a first electrode S3, a channel portion A3, and a second electrode D3 of the third transistor T3 may be formed from the second semiconductor pattern. The first electrode S3 and the second electrode D3 include a metal reduced from a metal oxide semiconductor. The first electrode S3 and the second electrode D3 may have a given thickness from an upper surface of the second semiconductor pattern and may include a metal layer including the reduced metal.

A fourth insulating layer 40 covering the second semiconductor pattern may be disposed on the third insulating layer 30. In an embodiment, the fourth insulating layer 40 may be a single silicon oxide layer. A third electrode G3 of the third transistor T3 may be disposed on the fourth insulating layer 40. The third electrode G3 may be a portion of a metal pattern. The third electrode G3 of the third transistor T3 may overlap, in a plan view, the channel portion A3 of the third transistor T3.

In an embodiment of the disclosure, the fourth insulating layer 40 may be replaced with an insulating pattern. The third electrode G3 of the third transistor T3 may be disposed on the insulating pattern. In an embodiment, the third electrode G3 may have the same shape as the insulating pattern in a plan view. In an embodiment, for convenience of description, one third electrode G3 is illustrated, but the third transistor T3 may include two third electrodes.

A fifth insulating layer 50 covering the third electrode G3 is disposed on the fourth insulating layer 40. In an embodiment, the fifth insulating layer 50 may include a silicon oxide layer and a silicon nitride layer. The fifth insulating layer 50 may include silicon oxide layers and silicon nitride layers, which are alternately stacked.

Although not illustrated separately, the first electrode and the second electrode of the fourth transistor T4 (refer to FIG. 4) may be formed through the same process as the first electrode S3 and the second electrode D3 of the third transistor T3. The first and second electrodes of the reset transistor ST1 of the light receiving sensor FX (refer to FIG. 3) may be simultaneously formed through the same process as the first electrode S3 and the second electrode D3 of the third transistor T3.

At least one insulating layer may further be disposed on the fifth insulating layer 50. In an embodiment, a sixth insulating layer 60 and a seventh insulating layer 70 may be disposed on the fifth insulating layer 50. The sixth insulating layer 60 and the seventh insulating layer 70 may be organic layers, and may have a single-layer or multi-layer structure. The sixth insulating layer 60 and the seventh insulating layer 70 may be a polyimide-based resin layer having a single layer structure. However, the disclosure is not limited thereto. For example, the sixth insulating layer 60 and the seventh insulating layer 70 may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin.

A first connection electrode CNE10 may be disposed on the fifth insulating layer 50. The first connection electrode CNE10 may be electrically connected to the connection signal line CSL through a first contact hole CH1 penetrating the first to fifth insulating layers 10 to 50, and a second connection electrode CNE20 may be electrically connected to the first connection electrode CNE10 through a contact hole CH2 penetrating the sixth insulating layer 60. In an embodiment of the disclosure, at least one of the fifth to seventh insulating layers 50 to 70 may be omitted.

The element layer DP_ED may include the light emitting element ED and a pixel defining layer PDL. The anode electrode P_AE of the light emitting element ED is disposed on the seventh insulating layer 70. The anode electrode P_AE of the light emitting element ED may be electrically connected to the second connection electrode CNE20 through a third contact hole CH3 penetrating the seventh insulating layer 70.

A first opening OP1 of the pixel defining layer PDL exposes at least part of the anode electrode P_AE of the light emitting element ED. The first opening OP1 of the pixel defining layer PDL may define an emission area PXA. For example, the pixels PX (refer to FIG. 3) may be arranged in a plan view of the display panel DP (refer to FIG. 3) according to a specific rule. An area in which the pixels PX are arranged may be defined as a pixel area. A pixel area may include the emission area PXA and a non-emission area NPXA adjacent to the emission area PXA. The non-emission area NPXA may surround the emission area PXA.

A light emitting layer EL may be disposed on the anode electrode P_AE. The light emitting layer EL may be disposed in only an area defined by the first opening OP1. The light emitting layer EL may be separately formed for each of the pixels PX. In an embodiment, the patterned light emitting layer EL is illustrated, but the disclosure is not limited thereto. A common light emitting layer may be disposed on the pixels PX in common. The common light emitting layer may generate white light or blue light.

The cathode electrode P_CA may be disposed on the light emitting layer EL. The cathode electrode P_CA is disposed in the pixels PX in common.

Although not shown in FIG. 5, a hole transport layer and a hole injection layer may be further interposed between the anode electrode P_AE and the light emitting layer EL. Furthermore, an electron transport layer and an electron injection layer may be further disposed between the light emitting layer EL and the cathode electrode P_CA.

The encapsulation layer TFE may be disposed on the cathode electrode P_CA. The encapsulation layer TFE may cover the pixels PX. In an embodiment, the encapsulation layer TFE directly covers the cathode electrode P_CA. In an embodiment of the disclosure, the display panel DP may further include a capping layer directly covering the cathode electrode P_CA. In other examples, the stacked structure of the light emitting element ED may have a vertically inverted structure compared to the structure shown in FIG. 5.

As illustrated in FIG. 5, the circuit layer DP_CL may further include a portion of a semiconductor pattern of the sensor driving circuit SDC (refer to FIG. 4). For convenience of description, the reset transistor ST1 is shown in the semiconductor patterns of the sensor driving circuit SDC. A first electrode RTS1, a channel portion RTA1, and a second electrode RTD1 of the reset transistor ST1 are formed from the second semiconductor pattern. The first electrode RTS1 and the second electrode RTD1 include a metal reduced from a metal oxide semiconductor. The first electrode RTS1 and the second electrode RTD1 may have a given thickness from an upper surface of the second semiconductor pattern and may include a metal layer including the reduced metal. The fourth insulating layer 40 may be disposed to cover the first electrode RTS1, the channel portion RTA1, and the second electrode RTD1 of the reset transistor ST1. A third electrode RTG1 of the reset transistor ST1 may be disposed on the fourth insulating layer 40. In an embodiment, the third electrode RTG1 may be a part of the metal pattern. The third electrode RTG1 of the reset transistor ST1 may overlap the channel portion RTA1 of the reset transistor ST1 in a plan view. In an embodiment, for convenience of description, the one third electrode RTG1 is illustrated, but the reset transistor ST1 may include two third electrodes.

In an embodiment of the disclosure, the reset transistor ST1 may be disposed on the same layer as the third transistor T3. The first electrode RTS1, the channel portion RTA1, and the second electrode RTD1 of the reset transistor ST1 may be formed through a process the same as the first electrode S3, the channel portion A3, and the second electrode D3 of the third transistor T3. The third electrode RTG1 of the reset transistor ST1 may be simultaneously formed through the same process as the third electrode G3 of the third transistor T3. Although not illustrated separately, the first electrode and the second electrode of each of the amplification transistor ST2 (refer to FIG. 4) and the output transistor ST3 (refer to FIG. 4) of the sensor driving circuit SDC may be formed through the same process as the first electrode S1 and the second electrode D1 of the first transistor T1.

The element layer DP_ED may further include the light receiving element OPD. The sensor anode electrode O_AE of the light receiving element OPD is disposed on the seventh insulating layer 70. Although not illustrated separately, the sensor anode electrode O_AE may be electrically connected to the second electrode RTD1 of the reset transistor ST1 through a contact hole penetrating the fourth to seventh insulating layers 40 to 70 in a plan view.

A second opening OP2 of the pixel defining layer PDL exposes at least part of the sensor anode electrode O_AE of the light receiving element OPD. The second opening OP2 of the pixel defining layer PDL may define a sensing area SA. When an area where a photoelectric conversion layer O_PCL is disposed is referred to as the "sensing area SA", a periphery of the sensing area SA may be defined as the "non-sensing area" NSA. In an embodiment of the disclosure, a non-pixel area NPA may be defined between the non-sensing area NSA and the non-emission area NPXA.

The sensor cathode electrode O_CA of the light receiving element OPD may be disposed on the photoelectric conversion layer O_PCL. The sensor cathode electrode O_CA is disposed on the light receiving sensors FX in common. In an embodiment of the disclosure, the sensor cathode electrode O_CA of the light receiving element OPD and the cathode electrode P_CA of the light emitting element ED may be integral with each other.

Figure 6:
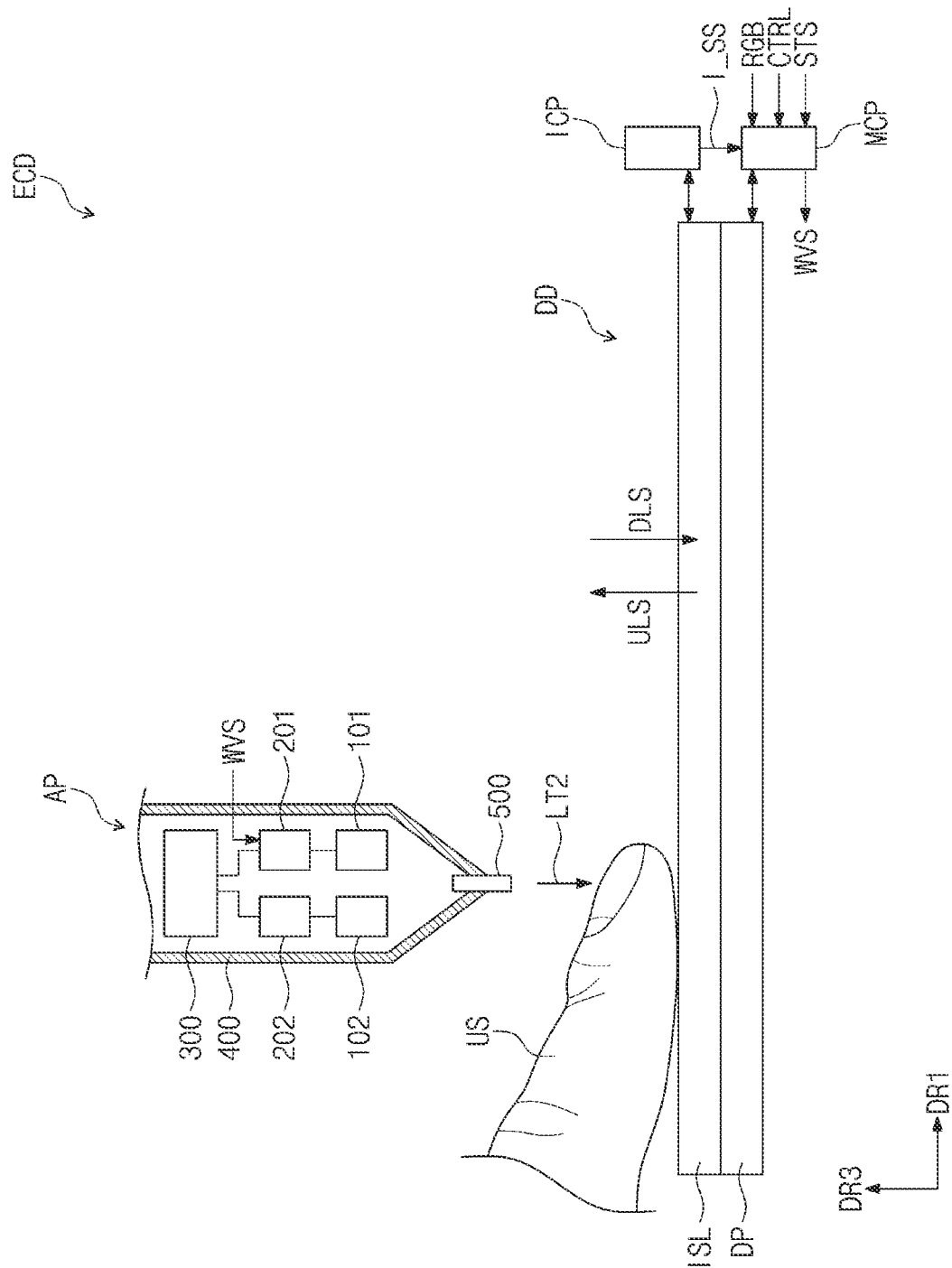
FIG. 6 is a block diagram illustrating an electronic device, according to an embodiment of the disclosure.

FIG. 6 is a block diagram illustrating an electronic device, according to an embodiment of the disclosure.

Referring to FIG. 6, the electronic device ECD according to an embodiment of the disclosure includes the display device DD and the input device AP. The display device DD may include the display panel DP, the input sensing layer ISL, the control module MCP, and a sensing controller ICP.

The display panel DP displays the image IM (refer to FIG. 1) depending on an electrical signal.

The input sensing layer ISL is disposed on the display panel DP so as to detect an external input. The input sensing layer ISL may detect an external input by a body of the user US or an external input by the input device AP.

The control module MCP may control overall operations of the display device DD. In an embodiment of the disclosure, the control module MCP may receive the image signal RGB, the external control signal CTRL, and the setting signal STS from the outside. The control module MCP may generate display signals for driving the display panel DP based on the image signal RGB and the external control signal CTRL. In an embodiment of the disclosure, the display signals may include data signals and scan signals. The control module MCP may control the display device DD to output the first light LT1 (refer to FIG. 9B), which is required to measure specified biometric information of the user US, based on the setting signal STS including the specified biometric information of the user US to be measured.

The sensing controller ICP may control an operation of the input sensing layer ISL. The sensing controller ICP may determine an operating frequency of the input sensing layer ISL. The sensing controller ICP may receive a signal including information about an operation of the display device DD from the control module MCP and may control the operating frequency of the input sensing layer ISL to operate in conjunction with the operating frequency of the display device DD. The sensing controller ICP may calculate coordinate information of an external input (e.g., a user's finger) based on signals received from the input sensing layer ISL and then may provide the control module MCP with a coordinate signal I_SS including the corresponding information. The control module MCP may execute an operation corresponding to an external input of the user US in the display device DD based on the coordinate signal I_SS. In an embodiment of the disclosure, on the basis of the coordinate signal I_SS, the control module MCP may calculate the biometric information of the user US by operating only light receiving sensors corresponding to an area, in which a finger of the user US is provided, in the display area DA (refer to FIG. 3). In this way, the power consumption of the electronic device ECD may be reduced.

The input device AP may include a light emitting module 101, a communication module 102, an emission controller 201, a communication controller 202, a power supply module 300, pen housing 400, and a pen electrode 500. However, the components constituting the input device AP are not limited to the listed components. For example, the input device AP may further include an electrode switch for switching an operating mode to a signal transmission mode or a signal reception mode, a pressure sensor for sensing pressure, a memory for storing selected information, or a rotation sensor for sensing rotation.

The pen housing 400 may have a pen shape, and an accommodation space may be formed in the pen housing 400. The light emitting module 101, the communication module 102, the emission controller 201, the communication controller 202, the power supply module 300, and the pen electrode 500 may be accommodated in the accommodation space defined inside the pen housing 400.

The power supply module 300 may supply power to the light emitting module 101, the communication module 102, the emission controller 201, and the communication controller 202, which may be disposed inside the input device AP. The power supply module 300 may include a battery or a high capacity capacitor.

The emission controller 201 may control the operation of the light emitting module 101. The emission controller 201 may control the wavelength band, the emission timing, and the emission period of the second light LT2 provided to the display device DD through the light emitting module 101. In an embodiment of the disclosure, the emission controller 201 may receive the emission control signal WVS from the control module MCP. On the basis of the emission control signal WVS, the emission controller 201 may control the light emitting module 101 to output the second light LT2 having a wavelength band required to measure the specified biometric information of the user US. The emission controller 201 may receive the emission control signal WVS through the input sensing layer ISL or may receive the emission control signal WVS in a wireless communication scheme.

The communication controller 202 may control the operation of the communication module 102. The communication controller 202 may control the timing of the signal provided to the display device DD through the communication module 102.

The light emitting module 101 may generate (or output) the second light LT2 under the control of the emission controller 201. For example, the light emitting module 101 may include a light emitting diode or the like. The second light LT2 emitted from the light emitting module 101 may be provided to the outside (e.g., the display device DD) through the pen electrode 500. However, the disclosure is not limited thereto. For example, the second light LT2 may be output through an empty space between the pen electrode 500 and the pen housing 400 or through a light transparent area provided in the pen housing 400. A detailed description of the light emitting module 101 will be described below with reference to FIG. 7.

The communication module 102 may include a transmission circuit and a reception circuit. In an embodiment of the disclosure, the display device DD and the input device AP may communicate with each other bidirectionally. The reception circuit may receive the uplink signal ULS provided from the input sensing layer ISL. The uplink signal ULS may include information about the operating frequency of the display device DD and the sensing frame of each of the light receiving sensors FX (refer to FIG. 3) to be described below. The transmission circuit may output a response signal for responding to the uplink signal ULS and the downlink signal DLS to the input sensing layer ISL. The downlink signal DLS may include coordinate information of an input provided by the input device AP, strength of the input, a tilt of the input device AP, the battery level of the input device AP, operating state, and information about the recognition ID of the input device AP. The transmission circuit may receive a signal provided from the communication controller 202 and then may modulate the received signal into a signal capable of being sensed by the input sensing layer ISL. The reception circuit may modulate a signal provided from the input sensing layer ISL into a signal processable by the communication controller 202. However, the disclosure is not limited thereto. For example, the display device DD may include a separate communication module capable of exchanging the uplink signal ULS and the downlink signal DLS with the communication module 102.

The pen electrode 500 may be electrically connected to the communication module 102. A portion of the pen electrode 500 may protrude from the pen housing 400. In other examples, the input device AP may further include cover housing that covers the pen electrode 500 exposed from the pen housing 400. In other examples, the pen electrode 500 may be embedded in the pen housing 400. The pen electrode 500 may directly contact the input sensing layer ISL in the input device AP.

Figure 7:
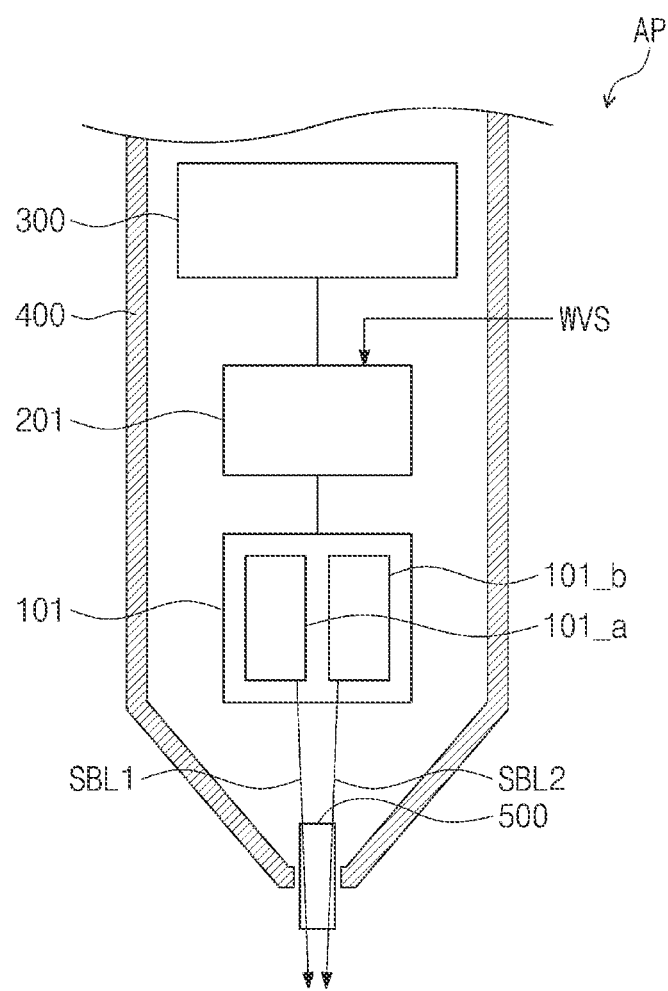
FIG. 7 is a block diagram illustrating an input device, according to an embodiment of the disclosure.

FIG. 7 is a block diagram illustrating an input device, according to an embodiment of the disclosure.

For convenience of description, FIG. 7 illustrates only some of the components included in the input device AP. Components that were described with reference to FIG. 6 have the same reference numerals, and redundant descriptions will be omitted.

Referring to FIG. 7, the light emitting module 101 may include a first sub light emitting module 101_a and a second sub light emitting module 101_b. The first sub light emitting module 101_a may provide first sub light SBL1 having a first wavelength band. The second sub light emitting module 101_b may provide second sub light SBL2 having a second wavelength band different from the first wavelength band. In an embodiment of the disclosure, the first wavelength band may be a visible light band. The second wavelength band may be an infrared band.

In an embodiment of the disclosure, the emission controller 201 may control operations of the first sub light emitting module 101_a and the second sub light emitting module 101_b. In case that the first sub light SBL1 of the first wavelength band is required to measure specific biometric information based on the emission control signal WVS, the emission controller 201 may turn on the first sub light emitting module 101_a and may turn off the second sub light emitting module 101_b. Accordingly, the input device AP may output the first sub light SBL1 as the second light LT2 (refer to FIG. 6). When the second sub light SBL2 of the second wavelength band is required to measure specific biometric information based on the emission control signal WVS, the emission controller 201 may turn off the first sub light emitting module 101_a and may turn on the second sub light emitting module 101_b. Accordingly, the input device AP may output the second sub light SBL2 as the second light LT2 (refer to FIG. 6). When the first sub light SBL1 having the first wavelength band and the second sub light SBL2 having the second wavelength band are required to measure specific biometric information based on the emission control signal WVS, the emission controller 201 may alternately turn on the first sub light emitting module 101_a and the second sub light emitting module 101_b. Accordingly, the input device AP may output the first sub light SBL1 or the second sub light SBL2 as the second light LT2 (refer to FIG. 6).

Figure 8:
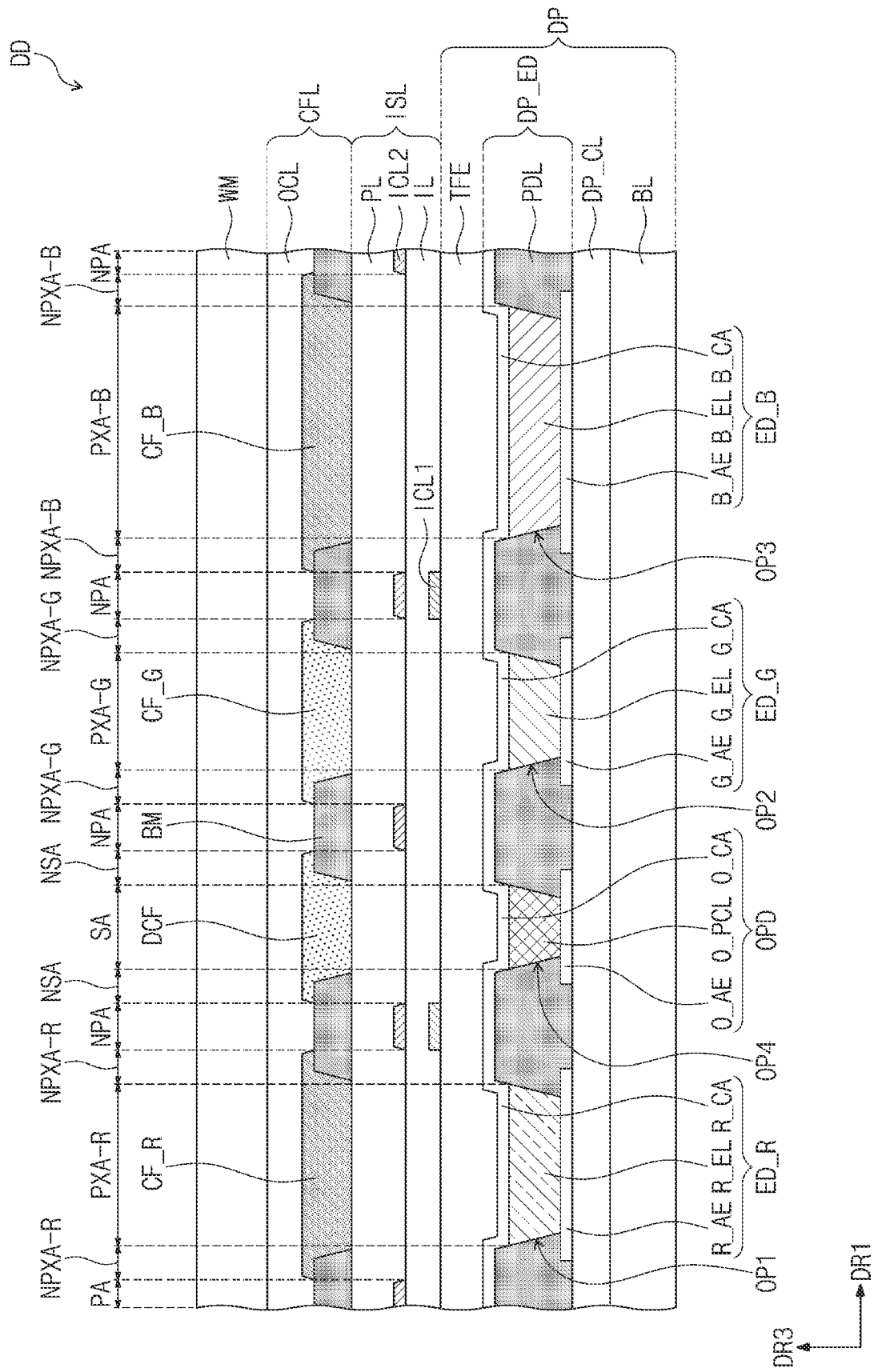
FIG. 8 is a schematic cross-sectional view illustrating a light emitting element and a light receiving element of a display panel, according to an embodiment of the disclosure.

FIG. 8 is a cross-sectional view illustrating a light emitting element and a light receiving element of a display panel, according to an embodiment of the disclosure. Components previously described with reference to FIG. 5 have the same reference numerals, and thus, redundant descriptions will be omitted.

Referring to FIG. 8, the pixels PX (refer to FIG. 3) included in the display panel DP may be a red pixel including a red light emitting element ED_R, a green pixel including a green light emitting element ED_G, and a blue pixel including a blue light emitting element ED_B. The red light emitting element ED_R may include a red anode electrode R_AE, a red light emitting layer R_EL, and a red cathode electrode R_CA. The green light emitting element ED_G may include a green anode electrode G_AE, a green light emitting layer G_EL, and a green cathode electrode G_CA. The blue light emitting element ED_B may include a blue anode electrode B_AE, a blue light emitting layer B_EL, and a blue cathode electrode B_CA.

In an embodiment of the disclosure, a first electrode layer is disposed on the circuit layer DP_CL. The pixel defining layer PDL is formed on the first electrode layer. The first electrode layer may include red, green, and blue anode electrodes R_AE, G_AE, and B_AE. The first to third openings OP1, OP2, and OP3 of the pixel defining layer PDL expose at least part of the red, green and blue anode electrodes RAE, G_AE, and B_AE, respectively. In an embodiment of the disclosure, the pixel defining layer PDL may further include a black material. The pixel defining layer PDL may further include a black organic dye/pigment such as carbon black or aniline black. The pixel defining layer PDL may be formed by mixing a blue organic material and a black organic material. The pixel defining layer PDL may further include a liquid-repellent organic material.

The display panel DP may include first to third emission areas PXA-R, PXA-G, and PXA-B and first to third non-emission areas NPXA-G, NPXA-B, and NPXA-R disposed adjacent to the first to third emission areas PXA-R, PXA-G, and PXA-B. The non-emission areas NPXA-R, NPXA-G, and NPXA-B may surround the corresponding emission areas PXA-R, PXA-G, and PXA-B, respectively. In an embodiment, the first emission area PXA-R may be defined to correspond to a partial area of the red anode electrode R_AE exposed by the first opening OP1. The second emission area PXA-G may be defined to correspond to a partial area of the green anode electrode G_AE exposed by the second opening OP2. The third emission area PXA-B may be defined to correspond to a partial area of the blue anode electrode B_AE exposed by the third opening OP3. Non-pixel areas NPA may be defined between the first to third non-emission areas NPXA-R, NPXA-G, and NPXA-B.

A light emitting layer may be disposed on the first electrode layer. The light emitting layer may include the red, green, and blue light emitting layers REL, GEL, and B_EL. The red, green, and blue light emitting layers R_EL, GEL, and B_EL may be disposed in areas corresponding to the first to third openings OP1, OP2, and OP3, respectively. The red, green, and blue light emitting layers R_EL, GEL, and B_EL may be separately formed in red, green, and blue pixels, respectively. Each of the red, green, and blue light emitting layers R_EL, G_EL, and B_EL may include an organic material and/or an inorganic material. The red, green, and blue light emitting layers R_EL, GEL, and B_EL may generate a color light. For example, the red light emitting layer REL may generate red light, the green light emitting layer G_EL may generate green light, and the blue light emitting layer B_EL may generate blue light.

In an embodiment, the patterned red, green and blue light emitting layers R_EL, G_EL, and B_EL are shown. However, one light emitting layer may be disposed in first to third emission areas PXA-R, PXA-G, and PXA-B in common. The light emitting layer may generate white light or blue light. The light emitting layer may have a multi-layer structure that is referred to as "tandem."

Each of the red, green, and blue light emitting layers R_EL, GEL, and B_EL may include a low molecular weight organic material or a high molecular weight organic material as a light emitting material. In other examples, each of the red, green, and blue light emitting layers R_EL, GEL, and B_EL may include a quantum dot material as a light emitting material. The core of a quantum dot may be selected from a group II-VI compound, a group III-V compound, a group IV-VI compound, a group IV element, a group IV compound, and a combination thereof.

A second electrode layer is disposed on the red, green and blue light emitting layers R_EL, GEL, and B_EL. The second electrode layer may include red, green, and blue cathode electrodes R_CA, G_CA, and B_CA. The red, green, and blue cathode electrodes R_CA, G_CA, and B_CA may be electrically connected to one another. In an embodiment of the disclosure, the red, green, and blue cathode electrodes R_CA, G_CA, and B_CA may be formed integrally with each other. The red, green, and blue cathode electrodes R_CA, G_CA, and B_CA may be disposed in common in the first to third emission areas PXA-R, PXA-G, and PXA-B, the first to third non-emission areas NPXA-R, NPXA-G, and NPXA-B, and the non-pixel area NPA.

The element layer DP_ED may further include the light receiving element OPD. The pixel defining layer PDL may further include a fourth opening OP4 that may correspond to the light receiving element OPD.

The sensor anode electrode O_AE of the light receiving element OPD may be disposed on the same layer as the first electrode layer. The sensor anode electrode O_AE of the light receiving element OPD may be disposed on the circuit layer DP_CL and may be simultaneously formed through the same process as the red, green, and blue anode electrodes R_AE, G_AE, and B_AE.

The fourth opening OP4 of the pixel defining layer PDL exposes at least part of the sensor anode electrode O_AE of the light receiving element OPD. The photoelectric conversion layer O_PCL of the light receiving element OPD is disposed on the sensor anode electrode O_AE exposed by the fourth opening OP4. The photoelectric conversion layer O_PCL may include an organic photo-sensing material. The sensor cathode electrode O_CA of the light receiving element OPD may be disposed on the photoelectric conversion layer O_PCL. The sensor cathode electrode O_CA may be simultaneously formed through the same process as the red, green, and blue cathode electrodes R_CA, G_CA, and B_CA. In an embodiment of the disclosure, the sensor cathode electrode O_CA and the red, green, and blue cathode electrodes R_CA, G_CA, and B_CA may be formed integrally with each other.

Each of the sensor anode electrode O_AE and the sensor cathode electrode O_CA may receive an electrical signal. The sensor anode electrode O_AE may receive a signal different from a signal received from the sensor cathode electrode O_CA. Accordingly, an electric field may be formed between the sensor anode electrode O_AE and the sensor cathode electrode O_CA. The photoelectric conversion layer O_PCL generates an electrical signal corresponding to the light incident onto the light receiving sensor FX (refer to FIG. 3). The photoelectric conversion layer O_PCL may generate charges by absorbing the energy of the incident light. For example, the photoelectric conversion layer O_PCL may include a light-sensitive semiconductor material.

The electric charge generated in the photoelectric conversion layer O_PCL changes the electric field between the sensing anode electrode O_AE and the sensing cathode electrode O_CA. The amount of charge generated by the photoelectric conversion layer O_PCL may vary depending on whether a light is incident onto the light receiving element OPD, the amount of light incident onto the light receiving element OPD, or the intensity of light incident onto the light receiving element OPD. Accordingly, the electric field formed between the sensing anode electrode O_AE and the sensing cathode electrode O_CA may be changed. The light receiving element OPD according to an embodiment of the disclosure may obtain fingerprint information of the user US (refer to FIG. 1) through a change in the electric field between the sensing anode electrode O_AE and the sensing cathode electrode O_CA. In other examples, the light receiving element OPD may include a phototransistor that includes the photoelectric conversion layer O_PCL as an active layer. The light receiving element OPD may obtain fingerprint information by sensing the amount of current flowing through the phototransistor. The light receiving element OPD according to an embodiment of the disclosure may include various photoelectric conversion elements capable of generating electrical signals in response to a change in the amount of light, but the disclosure is not limited thereto.

The encapsulation layer TFE may be disposed on the element layer DP_ED. The encapsulation layer TFE includes at least one inorganic layer or at least one organic layer. In an embodiment of the disclosure, the encapsulation layer TFE may include two inorganic layers and an organic layer interposed therebetween. In an embodiment of the disclosure, a thin-film encapsulation layer may include inorganic layers and organic layers, which are alternately stacked.

The encapsulation inorganic layer protects the red, green and blue light emitting elements ED_R, ED_G, and ED_B and the light receiving element OPD from moisture/oxygen, and the encapsulation organic layer protects the red, green and blue light emitting elements ED_R, ED_G, and ED_B and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not limited particularly thereto. The encapsulation organic layer may include an acryl-based organic layer.

The display device DD (refer to FIG. 1) may include the input sensing layer ISL disposed on the display panel DP, the color filter layer CFL disposed on the input sensing layer ISL, and the window WM.

The input sensing layer ISL may be directly disposed on the encapsulation layer TFE. The input sensing layer ISL may include a first conductive layer ICL1, an insulating layer IL, a second conductive layer ICL2, and a protective layer PL. The first conductive layer ICL1 may be disposed on the encapsulation layer TFE. FIG. 8 shows the first conductive layer ICL1 directly disposed on the encapsulation layer TFE, but the disclosure is not limited thereto. The input sensing layer ISL may further include a base insulating layer interposed between the first conductive layer ICL1 and the encapsulation layer TFE. The encapsulation layer TFE may be covered by the base insulating layer, and the first conductive layer ICL1 may be disposed on the base insulating layer. For example, the base insulating layer may include an inorganic insulating material.

The insulating layer IL may cover the first conductive layer ICL1. The second conductive layer ICL2 is disposed on the insulating layer IL. A structure in which the input sensing layer ISL includes the first and second conductive layers ICL1 and ICL2 is illustrated, but the disclosure is not limited thereto. For example, the input sensing layer ISL may include only one of the first and second conductive layers ICL1 and ICL2.

The protective layer PL may be disposed on the second conductive layer ICL2. The protective layer PL may include an organic insulating material. The protective layer PL may protect the first and second conductive layers ICL1 and ICL2 from moisture/oxygen, and may protect the first and second conductive layers ICL1 and ICL2 from foreign objects.

The color filter layer CFL may be disposed on the input sensing layer ISL. The color filter layer CFL may be directly disposed on the protective layer PL. The color filter layer CFL may include a first color filter CF_R, a second color filter CF_G, and a third color filter CF_B. The first color filter CF_R has a first color, the second color filter CF_G has a second color, and the third color filter CF_B has a third color. For example, the first color may be red, the second color may be green, and the third color may be blue.

The color filter layer CFL may further include a dummy color filter DCF. In an embodiment of the disclosure, the dummy color filter DCF may be disposed to correspond to the sensing area SA. The dummy color filter DCF may overlap the sensing area SA and the non-sensing area NSA.

For example, the dummy color filter DCF may have the same color as one of the first to third color filters CF_R, CF_G, and CF_B. For example, the dummy color filter DCF may have the same green color as the second color filter CF_G. However, the disclosure is not limited thereto. For example, the color filter layer CFL includes only the first to third color filters CF_R, CF_G, and CF_B, and may not include the dummy color filter DCF.

The color filter layer CFL may further include a black matrix BM. The black matrix BM may be disposed to correspond to the non-pixel area NPA. The black matrix BM may be disposed to overlap the first and second conductive layers ICL1 and ICL2 in the non-pixel area NPA. For example, the black matrix BM may overlap the non-pixel area NPA and the first to third non-emission areas NPXA-R, NPXA-G, and NPXA-B. The black matrix BM may not overlap the first to third emission areas PXA-R, PXR-G, and PXA-B.

The color filter layer CFL may further include an overcoat layer OCL. The overcoat layer OCL may include an organic insulating material. The overcoat layer OCL may be provided with a thickness sufficient to remove a step between the first to third color filters CF_R, CF_G, and CF_B. A material of the overcoat layer OCL may not be particularly limited as long as the material is capable of planarizing an upper surface of the color filter layer CFL with a given thickness and may include, for example, an acrylate-based organic material.

The window WM may be disposed on the color filter layer CFL.

Figure 9A:
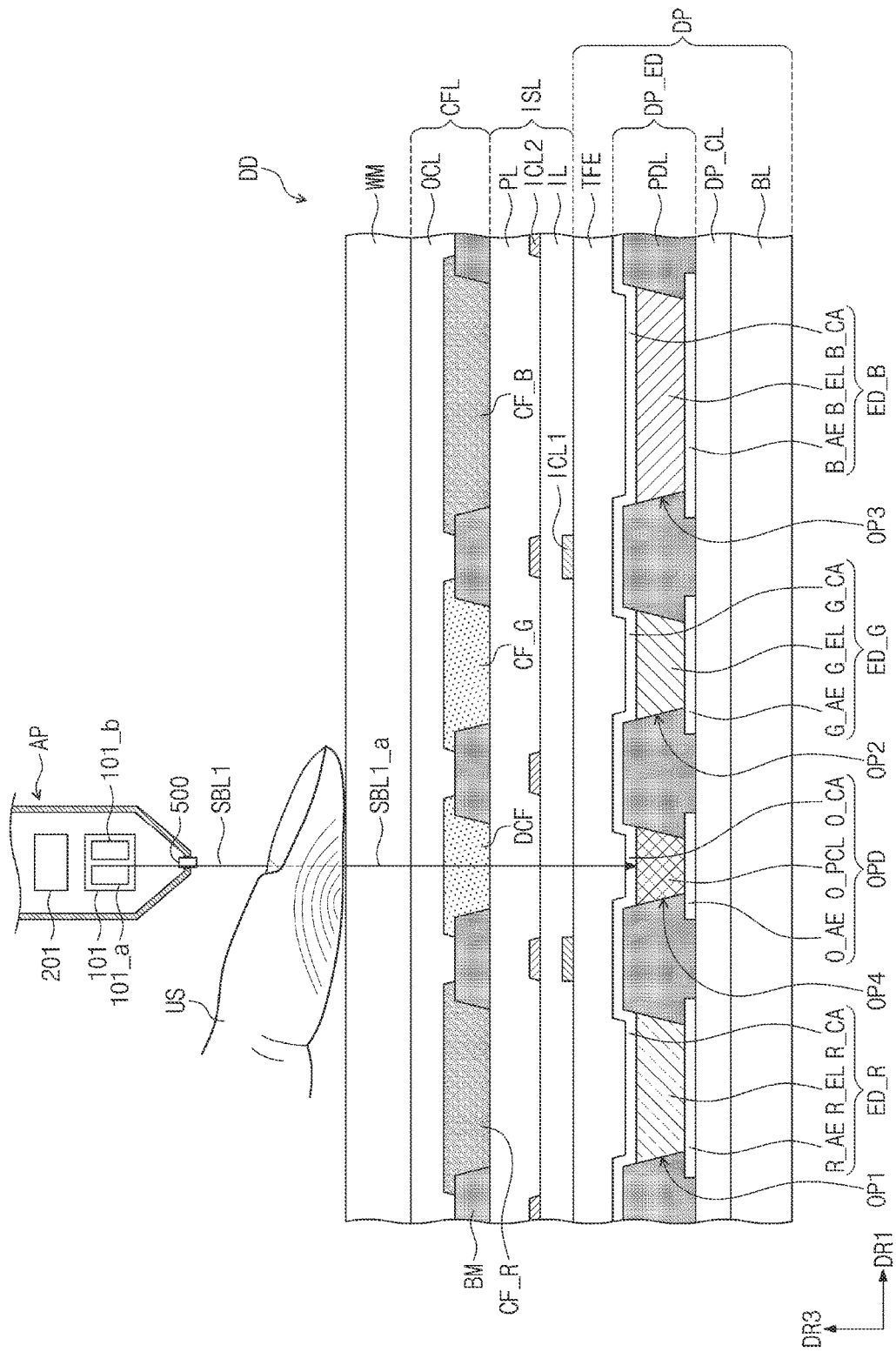
FIGS. 9A and 9B are schematic cross-sectional views of a display device for describing an operation of calculating a user's fingerprint information, according to an embodiment of the disclosure.
Figure 9B:
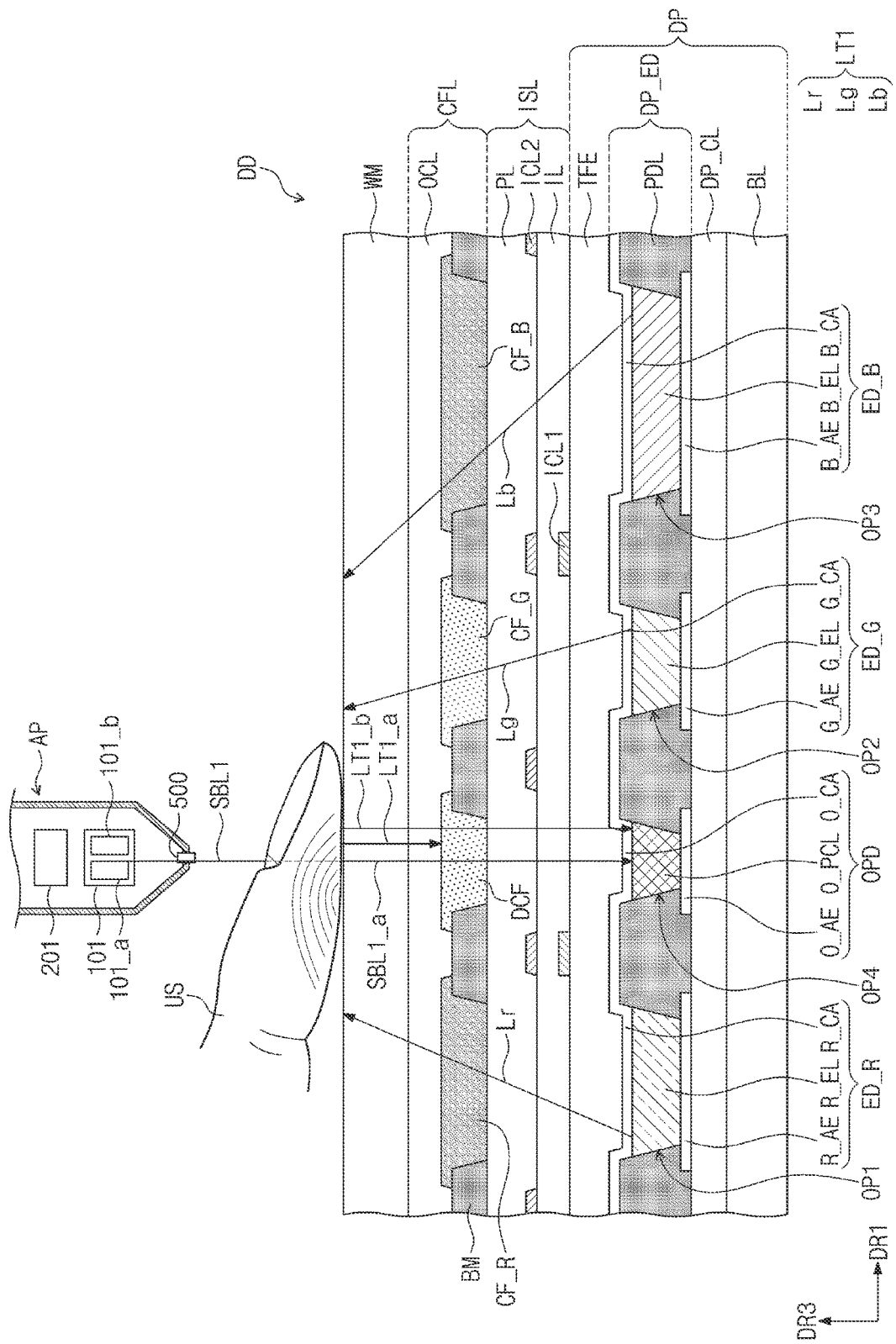
Figure 10:
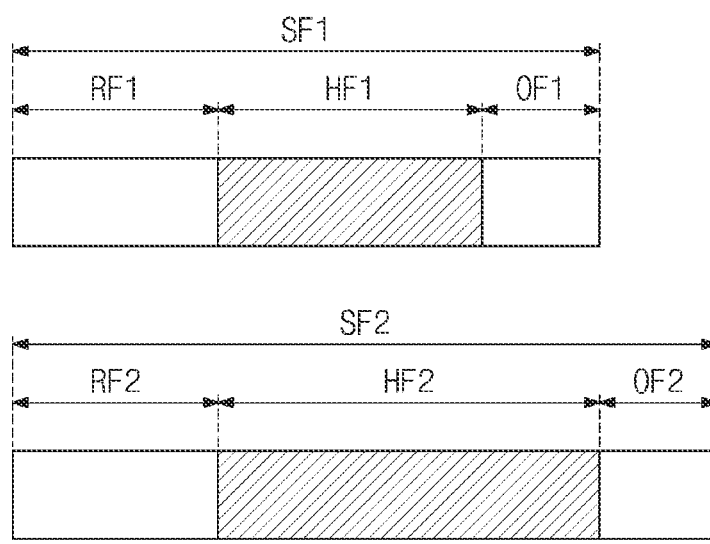
FIG. 10 is a diagram for describing an operation of an electronic device for calculating a user's fingerprint information, according to an embodiment of the disclosure.
Figure 11:
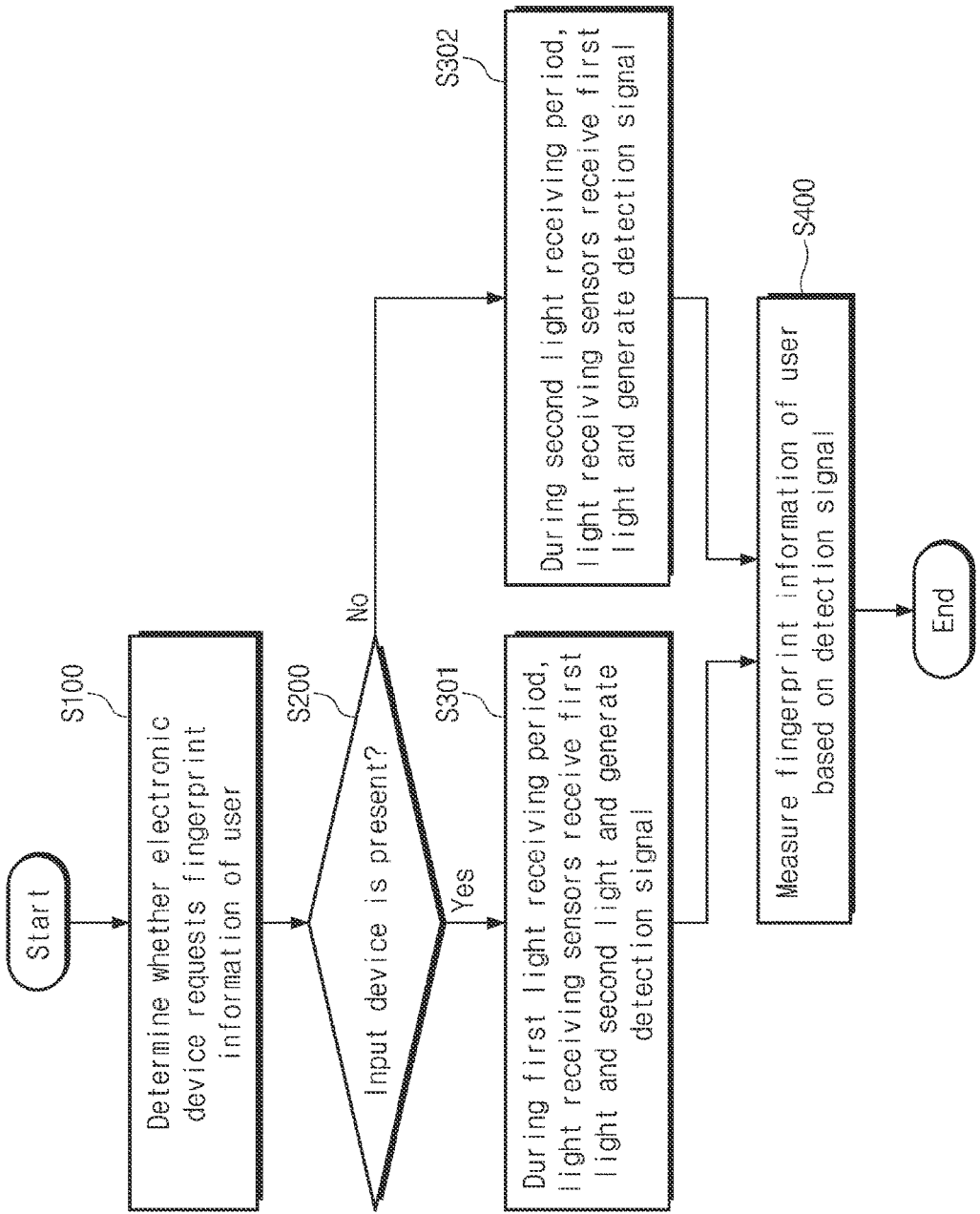
FIG. 11 is a flowchart illustrating an operation of an electronic device for calculating a user's fingerprint information, according to an embodiment of the disclosure.

FIGS. 9A and 9B are schematic cross-sectional views of a display device for describing an operation of calculating a user's fingerprint information, according to an embodiment of the disclosure. FIG. 10 is a diagram describing an operation of an electronic device for calculating a user's fingerprint information, according to an embodiment of the disclosure. FIG. 11 is a flowchart illustrating an operation of an electronic device for calculating a user's fingerprint information, according to an embodiment of the disclosure.

Referring to FIGS. 9A and 9B, a schematic cross-sectional view of the display device DD is shown when fingerprint information among biometric information of the user US is calculated by using the electronic device ECD (refer to FIG. 1). Below, components that are the same as the components described with reference to FIG. 8 are marked by the same reference numerals, and thus, redundant descriptions will be omitted.

To provide fingerprint information required by the electronic device ECD, the user US brings a part of the body (e.g., a finger or the like) into contact with the display surface IS (refer to FIG. 1) of the display device DD. Through the emission control signal WVS (refer to FIG. 6), the input device AP may provide light to the display device DD at a point in time when the electronic device ECD requests the fingerprint information of the user US. At this time, light having a wavelength in a visible light band, which passes through a finger of the user US or is reflected by the finger of the user US, needs to be provided to each of the light receiving sensors FX such that each of the light receiving sensors FX (refer to FIG. 3) included in the display device DD measures the fingerprint information of the user US. The light receiving element OPD included in each of the light receiving sensor FX generates photocharges corresponding to light passing through a ridge of a fingerprint or a valley between ridges or light reflected by the ridge of the fingerprint or the valley between the ridges.

Referring to FIGS. 7 and 9A, the input device AP provides the finger of the user US with the first sub light SBL1 having the first wavelength band of the visible light band. The first sub light SBL1 passes through a ridge and valley of the fingerprint. In an embodiment of the disclosure, when the dummy color filter DCF has green color, the first sub light SBL1 may be green light in a green wavelength band. When the dummy color filter DCF has red color, the first sub light SBL1 may be red light in a red wavelength band. When the dummy color filter DCF has blue color, the first sub light SBL1 may be blue light in a blue wavelength band.

The first sub light SBL1 passing through the finger is referred to as "first transmission light" SBL1_a. The first transmission light SBL1_a may be incident onto the light receiving element OPD. The light receiving element OPD may generate photocharges corresponding to the incident first transmission light SBL1_a.

Referring to FIGS. 7 and 9B, the input device AP provides a finger of the user US with the first sub light SBL1. The pixels PX (refer to FIG. 3) included in the display panel DP output the first light LT1 toward the finger of the user US. In an embodiment of the disclosure, the first light LT1 includes a red light Lr in the red wavelength band output by the red light emitting element ED_R, a green light Lg in the green wavelength band output by the green light emitting element ED_G, and a blue light Lb in the blue wavelength band output by the blue light emitting element ED_B.

The first light LT1 provided toward the finger may include a first reflection light LT1_a and a second reflection light LT1_b. In an embodiment of the disclosure, the first reflection light LT1_a may be light in a wavelength band that is not capable of passing through the dummy color filter DCF. The second reflection light LT1_b may be light in a wavelength band that is capable of passing through the dummy color filter DCF, and may be light incident onto the light receiving element OPD. In an embodiment of the disclosure, when the dummy color filter DCF has green color, the first reflection light LT1_a may be the red light Lr and the blue light Lb reflected by the finger, and the second reflection light LT1_b may be the green light Lg reflected by the finger. In an embodiment of the disclosure, when the dummy color filter DCF has red color, the first reflection light LT1_a may be the green light Lg and the blue light Lb reflected by the finger, and the second reflection light LT1_b may be the green light Lg reflected by the finger. In an embodiment of the disclosure, when the dummy color filter DCF has blue color, the first reflection light LT1_a may be the red light Lr and the green light Lg reflected by the finger, and the second reflection light LT1_b may be the blue light Lb reflected by the finger. The light receiving element OPD may generate photocharges corresponding to the incident first transmission light SBL1_a and the incident second reflection light LT1_b.

However, the disclosure is not limited thereto. When the dummy color filter DCF is not disposed on the light receiving element OPD, all the first light LT1 reflected by the finger may be incident onto the light receiving element OPD.

Referring to FIGS. 4, 9B, and 10, an operation of the light receiving sensors FX (refer to FIG. 3) includes reset periods RF1 and RF2 for initializing the first sensing node SN1 to the reset voltage RST through the reset transistor ST1, light receiving periods HF1 and HF2 for accumulating photocharges generated in response to light provided by the light receiving element OPD in the first sensing node SN1 without initializing the first sensing node SN1 to the reset voltage RST, and calculation periods OF1 and OF2 for calculating biometric information of the user US based on a detection signal provided by the light receiving sensors FX. In an embodiment of the disclosure, the reset transistor ST1 may not be turned on during the light receiving period. The entire operation, in which the light receiving sensors FX measures a biometric signal of the user US after the reset periods RF1 and RF2, the light receiving periods HF1 and HF2, and the calculation periods OF1 and OF2, may be referred to as "sensing periods" SF1 and SF2.

In an embodiment of the disclosure, the reset period RF1 in case that the input device AP provides the display panel DP with the second light LT2 may be referred to as a "first reset period" RF1. The reset period RF2 in case that the input device AP does not provide the display panel DP with the second light LT2 may be referred to as a "second reset period" RF2. The light receiving period HF1 in case that the input device AP provides the display panel DP with the second light LT2 may be referred to as a "first light receiving period" HF1. The light receiving period HF2 in case that the input device AP does not provide the display panel DP with the second light LT2 may be referred to as a "second light receiving period" HF2. The calculation period OF1 in case that the input device AP provides the display panel DP with the second light LT2 may be referred to as a "first calculation period" OF1. The calculation period OF2 in case that the input device AP does not provide the display panel DP with the second light LT2 may be referred to as a "second calculation period" OF2. When a sensing period in case that the input device AP provides the second light LT2 to the display panel DP is referred to as the "first sensing period SF1", the first sensing period SF1 includes the first reset period RF1, the first light receiving period HF1, and the first calculation period OF1. When a sensing period in case that the input device AP does not provide the second light LT2 to the display panel DP is referred to as the "second sensing period SF2", the second sensing period SF2 includes the second reset period RF2, the second light receiving period HF2, and the second calculation period OF2.

In an embodiment of the disclosure, the length of the first reset period RF1 may be the same as the length of the second reset period RF2. The length of the first calculation period OF1 may be the same as the length of the second calculation period OF2. However, the length of the first light receiving period HF1 may be different from the length of the second light receiving period HF2. The length of the first light receiving period HF1 is shorter than the length of the second light receiving period HF2. When the light receiving element OPD receives the first transmission light SBL1_$a$ and the second reflection light LT1_$b$, the biometric information may be calculated even though the light receiving element OPD generates photocharges during the first light receiving period HF1. On the other hand, when the light receiving element OPD receives only the second reflection light LT1_$b$, the biometric information may be calculated only when the light receiving element OPD generates photocharges during the second light receiving period HF2 longer than the first light receiving period HF1.

Referring to FIGS. 4, 9B, 10, and 11, an operation in which the electronic device ECD measures fingerprint information of the user US includes operation S100 of determining whether the electronic device ECD requests the fingerprint information of the user US. In an embodiment of the disclosure, the electronic device ECD requesting the fingerprint information of the user US may include a part of the body of the user US (e.g., a finger or the like) contacting the display surface IS where the image IM is not displayed on the display surface IS, or a where an application running on the electronic device ECD requests the fingerprint information of the user US to perform a specific operation (e.g., security authentication or the like).

The measuring of the fingerprint information of the user US by electronic device ECD includes operation S200 of determining whether the input device AP is present. When the input device AP is determined to be present, during the first light receiving period HF1, the light receiving sensors FX (refer to FIG. 3) receive the first light LT1 provided by the display panel DP and the second light LT2 provided by the input device AP, and generate a detection signal (S301). When the input device AP is determined to be not present, during the second light receiving period HF2, the light receiving sensors FX (refer to FIG. 3) receive the first light LT1 provided by the display panel DP and generate the detection signal (S302). In an embodiment of the disclosure, an operation measuring the fingerprint information of the user US may further include an operation of determining whether the input device AP provides the second light LT2 to the display panel DP. In case that the electronic device ECD determines that the input device AP provides the second light LT2 to the display panel DP, during the first light receiving period HF1, the light receiving sensors FX (refer to FIG. 3) may receive the first light LT1 provided by the display panel DP and the second light LT2 provided by the input device AP, and may generate a detection signal. When the input device AP is determined to not provide the second light LT2 to the display panel DP, during the second light receiving period HF2, the light receiving sensors FX (refer to FIG. 3) may receive the first light LT1 provided by the display panel DP and may generate the detection signal.

Operation S400 in which the electronic device ECD measures the fingerprint information of the user US based on the generated detection signal may be further included.

Figure 12A:
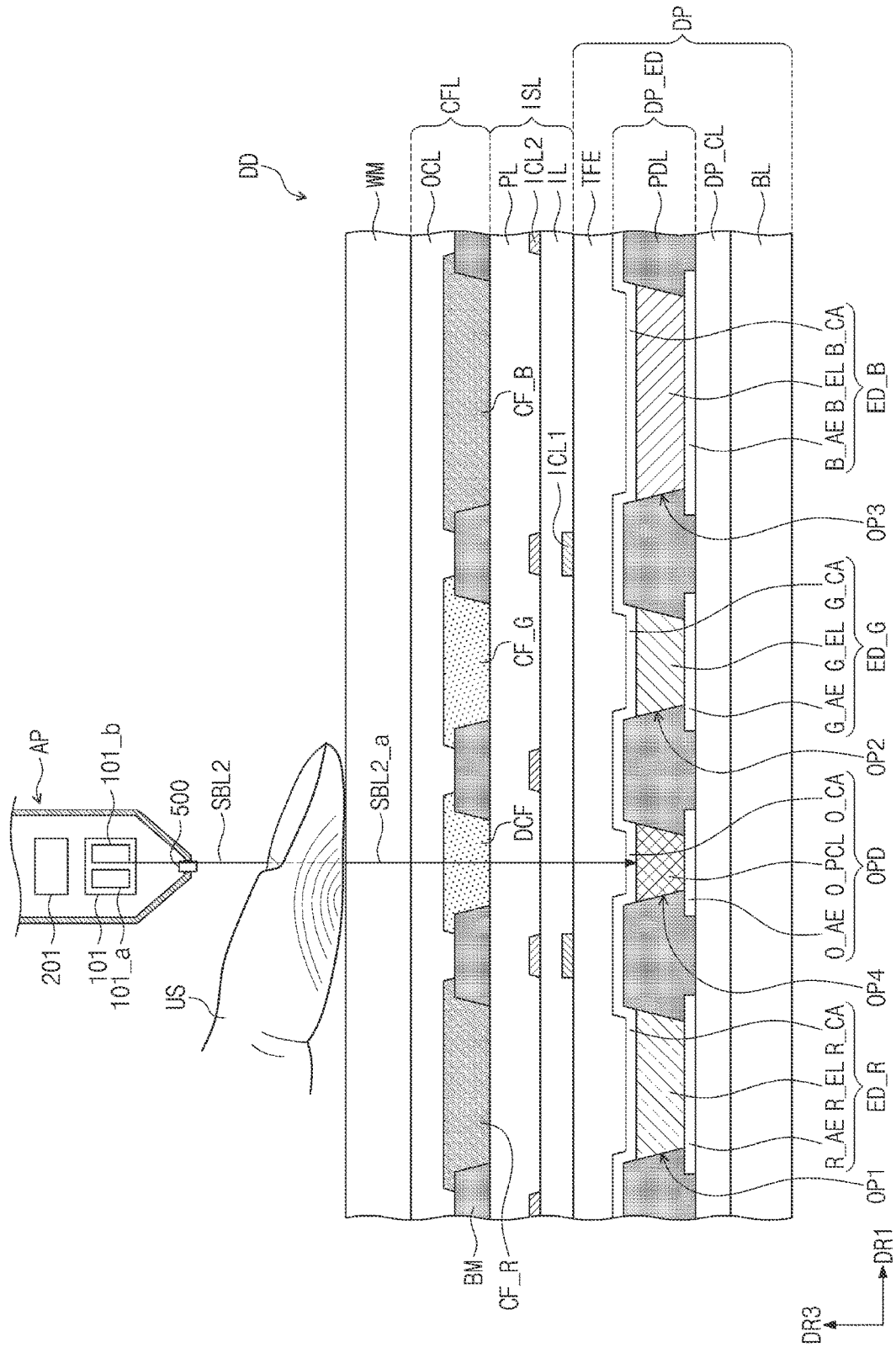
FIGS. 12A and 12B are schematic cross-sectional views of a display device for describing an operation of calculating a user's pulse information, according to an embodiment of the disclosure.
Figure 12B:
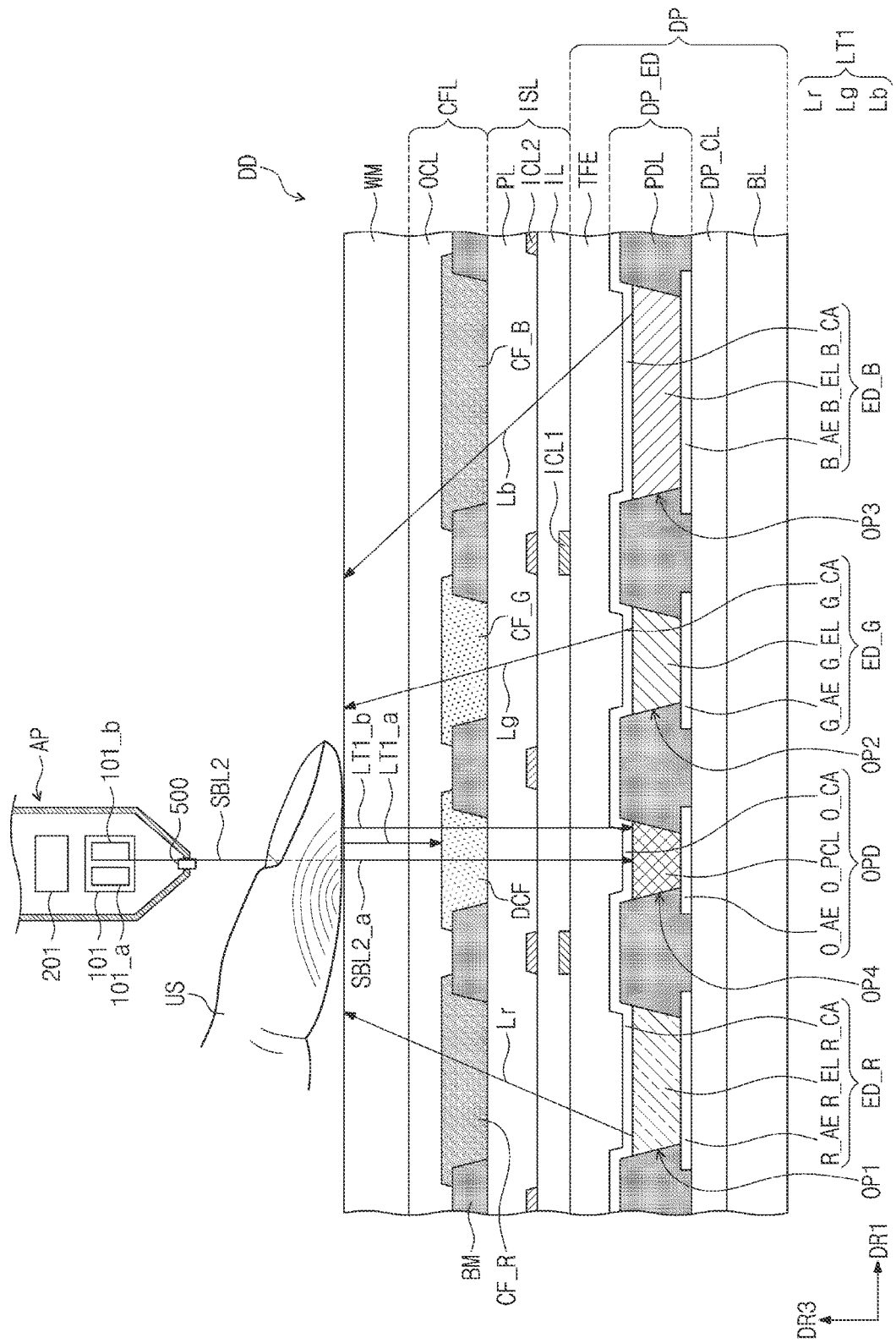
Figure 13:
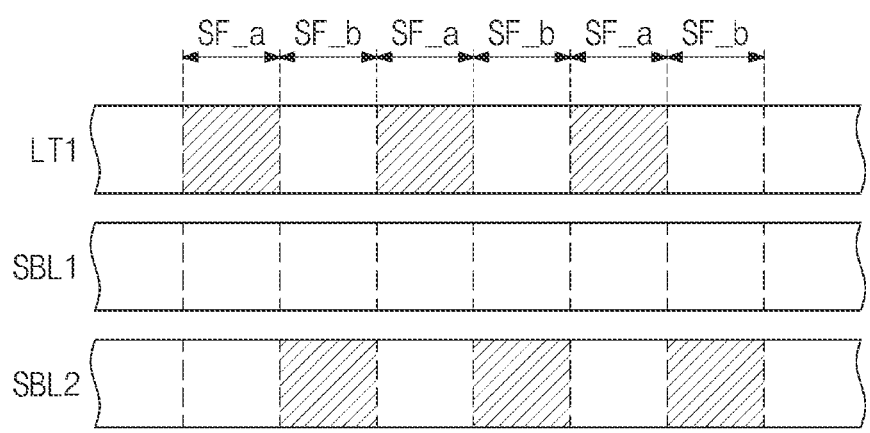
FIG. 13 is a diagram for describing an operation of an electronic device for calculating a user's pulse information, according to an embodiment of the disclosure.

FIGS. 12A and 12B are schematic cross-sectional views of a display device for describing an operation of calculating a user's pulse information, according to an embodiment of the disclosure. FIG. 13 is a diagram for describing an operation of an electronic device for calculating a user's pulse information, according to an embodiment of the disclosure.

Referring to FIGS. 12A and 12B, a cross-sectional view of the display device DD is shown when pulse information among biometric information of the user US is calculated by using the electronic device ECD (refer to FIG. 1). Below, components that are the same as the components described with reference to FIGS. 8, 9A, and 9B are marked by the same reference numerals, and thus, redundant descriptions will be omitted.

Referring to FIG. 12A, the user US may contact with the display surface IS (refer to FIG. 1) of the display device DD with part of the body (for example, with the finger) to measure pulse information. Through the emission control signal WVS (refer to FIG. 6), the input device AP may provide light to the display device DD at a point in time when the electronic device ECD measures the pulse information of the user US. Light having a wavelength in an infrared band, which passes through a finger of the user US or is reflected by the finger of the user US, needs to be provided to each of the light receiving sensors FX such that each of the light receiving sensors FX (refer to FIG. 3) included in the display device DD measures the pulse information of the user US. However, the wavelength band of light provided to the finger of the user US is not limited to the infrared band, and may include other wavelength bands (e.g., a red wavelength band) capable of detecting a change in blood in the finger. Hereinafter, for convenience of description, light provided to the finger may have a wavelength within an infrared band.

The light receiving element OPD included in each the light receiving sensor FX generates photocharges corresponding to light passing through a finger. The light passing through the finger of the user US may be absorbed and reflected by blood vessels and hemoglobin in blood that change volume depending on the pulse of the user US.

The input device AP provides the finger of the user US with the second sub light SBL2 having a second wavelength band of the infrared band. In an embodiment of the disclosure, the second wavelength band may be a wavelength within the near-infrared band of about 780 nm to about 1400 nm.

The second sub light SBL2 passing through the finger is referred to as "second transmission light" SBL2_a. The second transmission light SBL2_a may be incident onto the light receiving element OPD. The light receiving element OPD may generate photocharges corresponding to the incident second transmission light SBL2_a.

Referring to FIGS. 12B and 13, the input device AP provides a finger of the user US with the second sub light SBL2. The pixels PX (refer to FIG. 3) included in the display panel DP output the first light LT1 toward the finger of the user US. The first light LT1 includes the red light Lr in the red wavelength band output by the red light emitting element ED_R, the green light Lg in the green wavelength band output by the green light emitting element ED_G, and the blue light Lb in the blue wavelength band output by the blue light emitting element ED_B. The first light LT1 provided toward the finger may include the first reflection light LT1_a and the second reflection light LT1_b.

The time when the input device AP provides the second sub light SBL2 to the finger of the user US may be different than when the display panel DP provides the first light LT1 to the finger of the user US. During a first period SF_a, the display panel DP provides the first light LT1 to the finger of the user US, and the light receiving sensors FX measure biometric information of the user US based on the second reflection light LT1_b. During the first period SF_a, the electronic device ECD may calculate the fingerprint information of the user US.

During a second period SF_b, the input device AP provides the second sub light SBL2 to the finger of the user US, and the light receiving sensors FX measure the biometric information of the user US based on the second transmission light SBL2_a. During the second period SF_b, the electronic device ECD may calculate pulse information of the user US.

In case that the first period SF_a and the second period SF_b are alternately arranged, the electronic device ECD may calculate the fingerprint information and pulse information of the user US.

However, the disclosure is not limited thereto. During the first period SF_a, the input device AP may also provide the first sub light SBL1 to the finger of the user US. The light receiving sensors FX may calculate the fingerprint information of the user US based on the second reflection light LT1_b and the first transmission light SBL1_a (refer to FIG. 9B). During the first and second periods SF_a and SF_b, only the input device AP may provide the second sub light SBL2 to the user US and then may calculate only the pulse information of the user US.

Figure 14A:
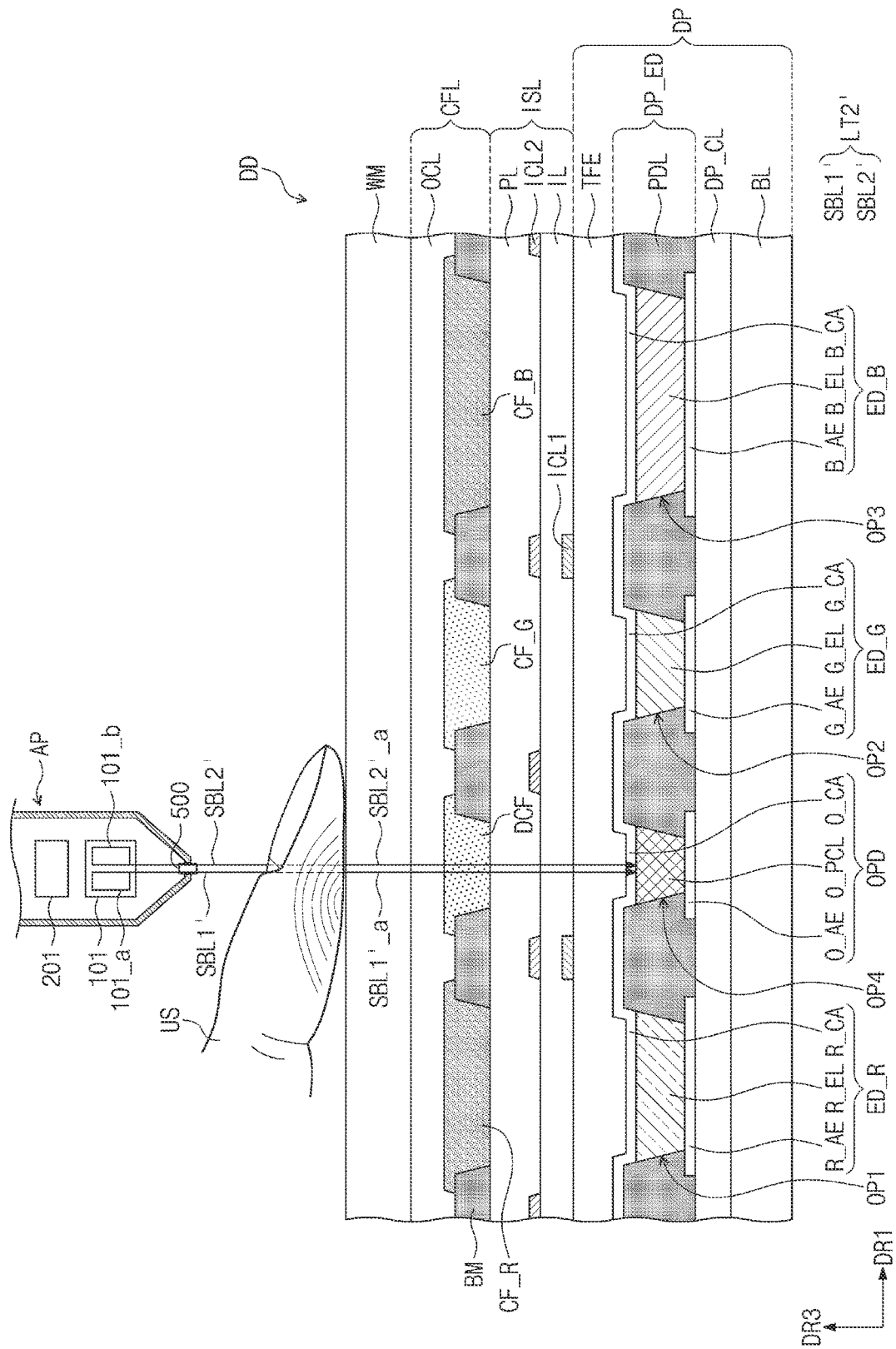
FIG. 14A is a schematic cross-sectional view of a display device for describing an operation of calculating a user's blood oxygen saturation, according to an embodiment of the disclosure.
Figure 14B:
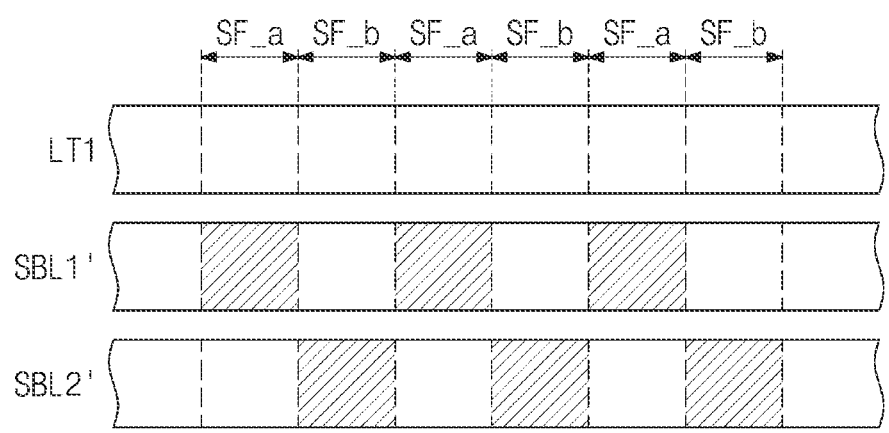
FIG. 14B is a diagram for describing an operation of an electronic device for calculating a user's blood oxygen saturation, according to an embodiment of the disclosure.

FIG. 14A is a schematic cross-sectional view of a display device for describing an operation of calculating a user's blood oxygen saturation, according to an embodiment of the disclosure. FIG. 14B is a diagram describing the operation of an electronic device that calculates a user's blood oxygen saturation, according to an embodiment of the disclosure.

Referring to FIG. 14A, a cross-sectional view of the display device DD is shown when blood oxygen saturation among biometric information of the user US is calculated by using the electronic device ECD (refer to FIG. 1). Components that were described with reference to FIGS. 8, 9A, 9B, 12A, and 12B are marked by the same reference numerals, and thus, redundant descriptions will be omitted.

Referring to FIG. 14A, the user US contacts the display surface IS (refer to FIG. 1) of the display device DD with a part of the body (for example, the finger) to measure the blood oxygen saturation. Through the emission control signal WVS (refer to FIG. 6), the input device AP may provide light to the display device DD at a point in time when the electronic device ECD measures the blood oxygen saturation of the user US. At this time, light having a wavelength in an infrared band and light having a wavelength in a visible light band, which pass through a finger of the user US or is reflected by the finger of the user US, needs to be respectively provided to the light receiving sensors FX such that each of the light receiving sensors FX (refer to FIG. 3) included in the display device DD measures the pulse information of the user US.

The light receiving element OPD included in each the light receiving sensor FX generates photocharges corresponding to light passing through a finger. Light passing through the finger of the user US may be absorbed and reflected by hemoglobin bound to blood oxygen in a different way than when it is reflected by hemoglobin not bound to blood oxygen.

The input device AP provides the finger of the user US with a first sub light SBL1' having the first wavelength band of the visible light band and a second sub light SBL2' having the second wavelength band of the infrared band. In an embodiment of the disclosure, the first wavelength band may be a wavelength within a red band, and the second wavelength band may be a wavelength within a near-infrared band of about 780 nm to about 1400 nm. The blood oxygen saturation of the user US may be measured because hemoglobin bound to blood oxygen absorbs and reflects the first sub light SBL1' having a wavelength within the red band and the second sub light SBL2' having a wavelength within the near-infrared band differently compared to when hemoglobin not bound to blood oxygen absorbs and reflects the first sub light SBL1' and the second sub light SBL2'.

Referring to FIGS. 14A and 14B, the time when the input device AP provides the first sub light SBL1 to the finger of the user US may be different from the time when the display panel DP provides the second sub light SBL2 to the finger of the user US. During the first period SF_a, the input device AP provides the first sub light SBL1' to the finger of the user US, and the light receiving sensors FX measure the biometric information of the user US based on a first transmission light SBL1'_a. During the second period SF_b, the input device AP provides the second sub light SBL2' to the finger of the user US, and the light receiving sensors FX measure the biometric information of the user US based on a second transmission light SBL2'_a.

In an embodiment of the disclosure, the first period SF_a and the second period SF_b may be alternately arranged. The electronic device ECD may measure the blood oxygen saturation of the user US based on the biometric information measured during the first period SF_a and the biometric information measured during the second period SF_b.

Figure 15A:
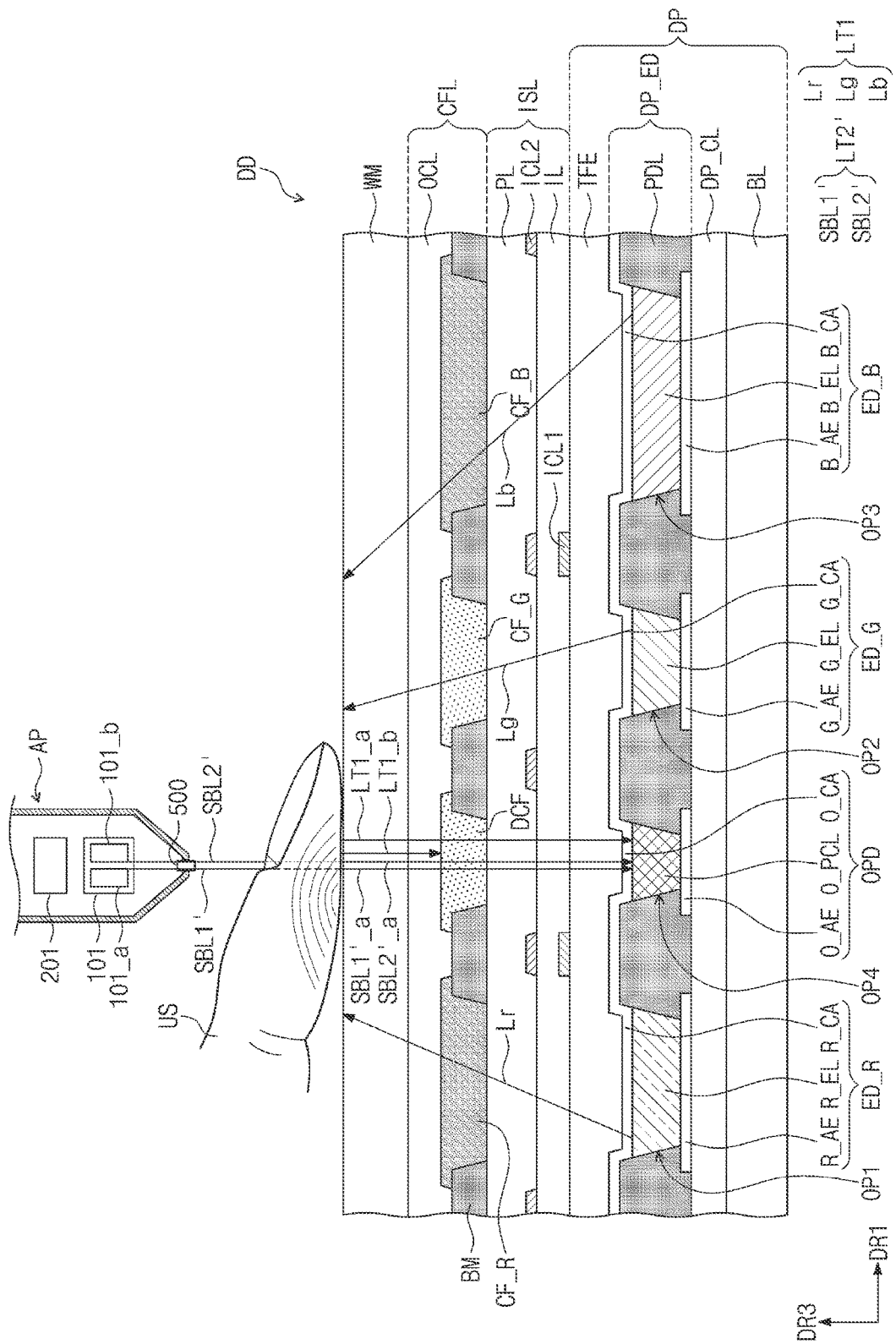
FIG. 15A is a schematic cross-sectional view of a display device for describing an operation of calculating a user's blood oxygen saturation, according to an embodiment of the disclosure.
Figure 15B:
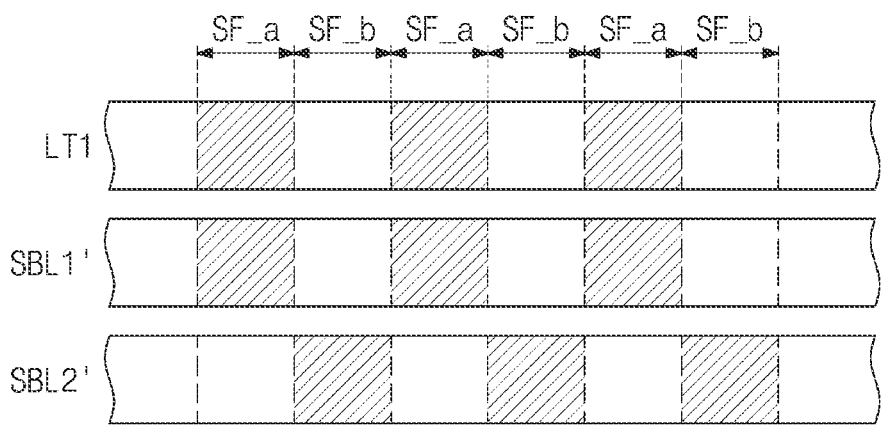
FIGS. 15B and 15C are diagrams for describing an operation of an electronic device for calculating a user's blood oxygen saturation, according to an embodiment of the disclosure.
Figure 15C:
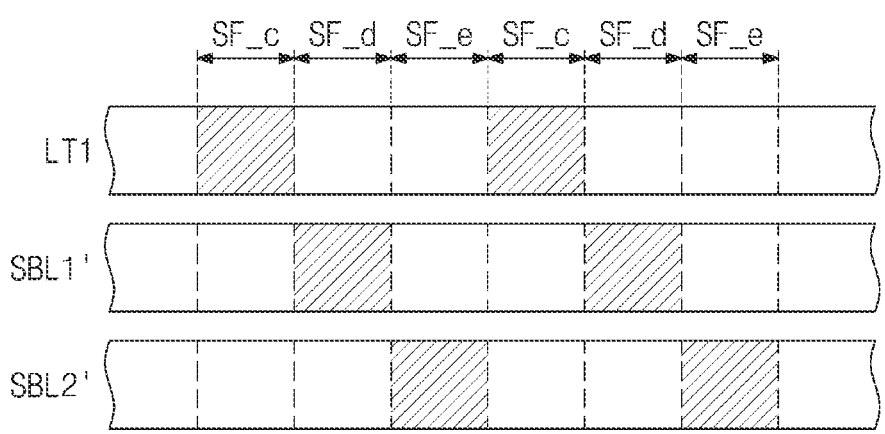

FIG. 15A is a schematic cross-sectional view of a display device for describing an operation of calculating a user's blood oxygen saturation, according to an embodiment of the disclosure. FIGS. 15B and 15C are diagrams for describing an operation of an electronic device for calculating a user's blood oxygen saturation, according to an embodiment of the disclosure. Components that were described with reference to FIGS. 8, 12A, 12B, 14A, and 14B are marked by the same reference numerals, and thus, redundant descriptions will be omitted.

Referring to FIGS. 15A and 15B, the input device AP provides a finger of the user US with the first and second sub light SBL1' and SBL2'. The pixels PX (refer to FIG. 3) included in the display panel DP output the first light LT1 toward the finger of the user US.

The time when the input device AP provides the first and second sub light SBL1' and SBL2' to the finger of the user US may be different from the time when the display panel DP provides the first light LT1 to the finger of the user US. During the first period SF_a, the display panel DP may provide the first light LT1 to the finger of the user US, and the input device AP may provide the first sub light SBL1' to the finger of the user US. During the first period SF_a, the light receiving sensors FX measure the biometric information of the user US based on the second reflection light LT1_b and the first transmission light SBL1'_a.

During the second period SF_b, the input device AP may provide the second sub light SBL2' to the finger of the user US, and the light receiving sensors FX may measure the biometric information of the user US based on the second transmission light SBL2'_a.

The electronic device ECD may measure the blood oxygen saturation of the user US based on the biometric information measured during the first period SF_a and the biometric information measured during the second period SF_b. At this time, because the input device AP as well as the display panel DP provides the first light LT1 during the first period SF_a, the length of the light receiving period for calculating biometric information by light of a wavelength within the visible light band may be shortened as compared with a case of FIG. 14B.

Referring to FIGS. 15A and 15C, the input device AP provides the first and second sub light SBL1' and SBL2' to the finger of the user. The pixels PX (refer to FIG. 3) included in the display panel DP output the first light LT1 toward the finger of the user US.

in the time when the input device AP provides the first and second sub light SBL1' and SBL2' to the finger of the user US may be different from a time when the display panel DP provides the first light LT1 to the finger of the user US. During a third period SF_c, the display panel DP provides the first light LT1 to the finger of the user US, and the light receiving sensors FX measure biometric information of the user US based on the second reflection light LT1_b. During the third period SF_c, the electronic device ECD may calculate the fingerprint information of the user US.

During a fourth period SF_d, the input device AP provides the first sub light SBL1' to the finger of the user US, and the light receiving sensors FX measure the biometric information of the user US based on the first transmission light SBL1' a. During a fifth period SF_e, the input device AP provides the second sub light SBL2' to the finger of the user US, and the light receiving sensors FX measure the biometric information of the user US based on the second transmission light SBL2'_a. The electronic device ECD may measure the blood oxygen saturation of the user US based on the biometric information measured during the fourth and fifth periods SF_d and SF_e. In an embodiment of the disclosure, the third to fifth periods SF_c, SF_d, and SF_e may be alternately arranged.

As described above, embodiments are disclosed in the drawings and specifications. Specific terms are used herein, but are only used for the purpose of describing the disclosure, and are not used to limit the meaning or the scope of the disclosure described in claims. Therefore, it will be understood that various modifications and other equivalent embodiments are possible from this point by those skilled in the art.

According to an embodiment of the disclosure, light receiving sensors included in a display panel may receive light provided toward a user's body from an external input device so as to measure a user's biometric information. Light received from the input device is received by using light receiving sensors included in an element layer of a display panel, and thus there is no need to include a separate light receiving unit. According to an embodiment of the disclosure, many kinds of the user's biometric information measured by providing light of various wavelength bands.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. An electronic device comprising:
a display panel including a base layer, and an element layer disposed on the base layer, the element layer including pixels outputting a first light, and light receiving sensors;
an input device providing a second light to the display panel; and
a control module controlling operations of the display panel and the input device,
wherein the light receiving sensors detect the second light provided from the input device and generate a detection signal, and
the control module calculates biometric information of a user based on the detection signal,
wherein the input device includes:
a light emitting module providing the second light; and
an emission controller electrically connected to the light emitting module, the emission controller controlling an operation of the light emitting module,
wherein:
the control module receives a setting signal including information about a type of the biometric information to be measured, converts the setting signal into an emission control signal capable of being recognized by the input device, and transmits the emission control signal to the emission controller, and
the emission controller controls the operation of the light emitting module depending on the emission control signal.

2. The electronic device of claim 1, wherein each of the pixels includes:
a light emitting element; and a pixel driving circuit electrically connected to the light emitting element, the
pixel driving circuit controlling an operation of the light emitting element, and
each of the light receiving sensors includes:
a light receiving element; and
a sensing driving circuit electrically connected to the light receiving element,
the sensing driving circuit controlling an operation of the light receiving element.

3. The electronic device of claim 2, wherein the light emitting element and the light receiving element are disposed on a same layer.

4. The electronic device of claim 1, wherein the control module receives the detection signal from the light receiving sensors, and calculates the biometric information based on the setting signal and the detection signal.

5. The electronic device of claim 1, wherein the emission controller determines a wavelength of the second light generated by the light emitting module in response to the emission control signal.

6. The electronic device of claim 5, wherein
the biometric information includes fingerprint information of the user, and
the second light has a wavelength in a visible light band.

7. The electronic device of claim 6, wherein the second light is red light or green light.

8. The electronic device of claim 5, wherein
the biometric information includes pulse information of the user, and
the second light has a wavelength in an infrared band.

9. The electronic device of claim 8, wherein the second light has a wavelength of about 780 nm to about 1400 nm.

10. The electronic device of claim 5, wherein
the biometric information includes blood oxygen saturation information of the user, and
the second light has a wavelength in a visible light band during a first period and has a wavelength in an infrared band during a second period.

11. The electronic device of claim 10, wherein the first period and the second period are arranged alternately.

12. The electronic device of claim 5, wherein the light emitting module includes:
a first sub light emitting module that provides a first sub light having a first wavelength band; and
a second sub light emitting module that provides a second sub light having a second wavelength band different from the first wavelength band.

13. The electronic device of claim 12, wherein
the biometric information includes fingerprint information of the user,
the emission controller turns on the first sub light emitting module and turns off the second sub light emitting module, and
the light emitting module outputs the first sub light as the second light.

14. The electronic device of claim 12, wherein
the biometric information includes pulse information of the user,
the emission controller turns on the second sub light emitting module and turns off the first sub light emitting module, and
the light emitting module outputs the second sub light as the second light.

15. The electronic device of claim 12, wherein
the biometric information includes blood oxygen saturation information of the user, during a first period, the emission controller turns on the first sub light emitting module and outputs the first sub light as the second light,
during a second period, the emission controller turns on the second sub light emitting module and outputs the second sub light as the second light, and
the first period and the second period are arranged alternately.

16. An electronic device comprising:
a display panel including a base layer, and an element layer disposed on the base layer, the element layer including pixels outputting a first light, and light receiving sensors;
an input device providing a second light to the display panel; and
a control module controlling operations of the display panel and the input device,
wherein the light receiving sensors detect the first light and the second light, and generate a detection signal, and
the control module measures biometric information of a user based on the detection signal, and
wherein
the control module receives a setting signal including information about the biometric information to be measured, and determines a wavelength of the first light generated by the display panel from the setting signal,
the control module converts the setting signal into an emission control signal capable of being recognized by the input device and transmits the emission control signal to the input device, and
the input device determines a wavelength of the second light from the emission control signal.

17. The electronic device of claim 16, wherein
each of the pixels includes:
a light emitting element; and
a pixel driving circuit electrically connected to the light emitting element the pixel driving circuit controlling an operation of the light emitting element, and
each of the light receiving sensors includes:
a light receiving element; and
a sensing driving circuit electrically connected to the light receiving element, the sensing driving circuit controlling an operation of the light receiving element.

18. The electronic device of claim 16, wherein the input device includes:
a light emitting module providing the second light; and
an emission controller electrically connected to the light emitting module, the emission controller controlling an operation of the light emitting module in response to the emission control signal.

19. The electronic device of claim 18, wherein
the biometric information includes fingerprint information of the user, and
the first light and the second light have a same wavelength band in a visible light band.

20. The electronic device of claim 18, wherein
the biometric information includes at least one of pulse information of the user and a blood oxygen saturation level of the user,
during a first period, the display panel outputs the first light and the first light has a wavelength in a visible light band, during a second period, the input device outputs the second light and the second light has a wavelength in an infrared band, and the first period does not overlap the second period with respect to a time axis.

21. The electronic device of claim 20, wherein in case that the biometric information corresponds to the blood oxygen saturation level, a wavelength of the first light is determined to be a red band wavelength.

22. A driving method of an electronic device which includes an input device and a display panel including a base layer and an element layer which includes pixels outputting a first light, and light receiving sensors, the method comprising:

determining whether the electronic device requests fingerprint information of a user;

determining that the input device does not provide the display panel with a second light;

receiving the first light during a first light receiving period; and receiving, by the light receiving sensors, the first light during a second light receiving period and generating a detection signal; and measuring the fingerprint information of the user based on the detection signal, wherein a length of the first light receiving period is shorter than a length of the second light receiving period.

* * * * *